United States Patent
Takao et al.

(10) Patent No.: US 10,364,370 B1
(45) Date of Patent: Jul. 30, 2019

(54) COATING COMPOSITION AND COATING FILM FORMED FROM THE SAME

(71) Applicant: NIPPON PAINT MARINE COATINGS CO., LTD., Kobe-shi, Hyogo (JP)

(72) Inventors: Yusuke Takao, Osaka (JP); Tomohiro Tsuji, Osaka (JP); Wataru Kitamura, Osaka (JP); Yasuhisa Nagase, Osaka (JP); Hirokazu Kaji, Osaka (JP)

(73) Assignee: NIPPON PAINT MARINE COATINGS CO., LTD., Hyogo (JP)

( * ) Notice: Subject to any disclaimer, the term of this patent is extended or adjusted under 35 U.S.C. 154(b) by 0 days.

(21) Appl. No.: 16/071,196

(22) PCT Filed: Mar. 30, 2018

(86) PCT No.: PCT/JP2018/013776
§ 371 (c)(1),
(2) Date: Jul. 19, 2018

(51) Int. Cl.
*C09D 143/04* (2006.01)
*C09D 5/16* (2006.01)
*C09D 7/65* (2018.01)
*C08L 83/04* (2006.01)

(52) U.S. Cl.
CPC .......... *C09D 143/04* (2013.01); *C09D 5/165* (2013.01); *C09D 7/65* (2018.01); *C08L 83/04* (2013.01)

(58) Field of Classification Search
None
See application file for complete search history.

(56) References Cited

U.S. PATENT DOCUMENTS

| | | |
|---|---|---|
| 2007/0272119 A1 | 11/2007 | Ichinose et al. |
| 2010/0324250 A1* | 12/2010 | Yamaguchi ........ B01D 19/0409 528/25 |
| 2012/0123045 A1 | 5/2012 | Mitomi et al. |
| 2012/0202076 A1 | 8/2012 | Ehara et al. |
| 2012/0202080 A1 | 8/2012 | Ehara et al. |
| 2012/0294825 A1* | 11/2012 | Ehara ............... C09D 5/165 424/78.09 |
| 2015/0210797 A1 | 7/2015 | Tamura et al. |
| 2015/0299515 A1 | 10/2015 | Tanino |

FOREIGN PATENT DOCUMENTS

| | | | |
|---|---|---|---|
| EP | 2 128 208 A1 | 12/2009 | |
| EP | 2 204 423 A1 | 7/2010 | |
| JP | 11152428 A * | 6/1999 | ............... C09D 5/00 |
| JP | 11-263937 A | 9/1999 | |
| JP | 2000229984 A * | 8/2000 | ........... C09D 5/1625 |
| JP | 2003-226834 A | 8/2003 | |
| JP | 2014156595 A * | 8/2014 | ............... C08F 8/12 |
| JP | 2016003249 A * | 1/2016 | ............... C09D 5/16 |
| WO | 2005/116155 A1 | 12/2005 | |
| WO | 2008/105122 A1 | 9/2008 | |
| WO | 2009/031509 A1 | 3/2009 | |
| WO | 2010/119969 A1 | 10/2010 | |
| WO | 2011/013789 A1 | 2/2011 | |
| WO | 2011/046086 A1 | 4/2011 | |
| WO | 2011/046087 A1 | 4/2011 | |
| WO | WO-2011046087 A1 * | 4/2011 | ............. B63B 59/04 |
| WO | 2011/118526 A1 | 9/2011 | |
| WO | 2014/017542 A1 | 1/2014 | |

OTHER PUBLICATIONS

International Search Report for PCT/JP2018/013776 dated Jun. 26, 2018 [PCT/ISA/210].
JNC Silaplane Product Sheet, JNC Corporation, 2018, total 2 pages.
International Search Report for PCT/JP2018/013780 dated Jun. 26, 2018 [PCT/ISA/210].
Office Action dated Jan. 8, 2019 from Japanese Patent Office in counterpart JP Application No. 2018-536521.
Office Action dated Jan. 11, 2019 from the US Patent and Trademark Office in counterpart U.S. Appl. No. 16/071,161.

* cited by examiner

*Primary Examiner* — Catherine S Branch
(74) *Attorney, Agent, or Firm* — Sughrue Mion, PLLC

(57) ABSTRACT

Provided are a coating composition containing a silicon atom-containing resin and a defoaming agent, a coating film formed from the same, an in-water structure and a ship having the coating film. In the coating composition, the silicon atom-containing resin includes a constituent unit (A) derived from a monomer (a) having at least one kind of silicon atom-containing group selected from the group consisting of groups represented by the formula (I), the formula (II), the formula (III), and the formula (IV), the monomer (a) has a molecular weight of greater than or equal to 400 and less than or equal to 2500, and the content of the defoaming agent is greater than or equal to 0.7 parts by mass and less than or equal to 24 parts by mass with respect to 100 parts by mass of the silicon atom-containing resin.

15 Claims, No Drawings

COATING COMPOSITION AND COATING FILM FORMED FROM THE SAME

CROSS REFERENCE TO RELATED APPLICATIONS

This application is a National Stage of International Application No. PCT/JP2018/013776, filed on Mar. 30, 2018.

TECHNICAL FIELD

The present invention relates to a coating composition containing a silicon atom-containing resin. The present invention also relates to a coating film formed from the coating composition, a composite coating film including the coating film, and an in-water structure and a ship provided with the coating film or the composite coating film.

BACKGROUND ART

Organisms such as barnacles, mussels, and algae are likely to adhere to in-water structures and ships. For example, in a ship, the adhesion of organisms causes a problem such as hindrance of efficient travel and waste of fuel. Conventionally, an antifouling coating composition is applied on the surface of the ship or the like in order to prevent the adhesion of organisms.

WO 2011/046086 (PTD 1) discloses an antifouling coating composition containing a silicon atom-containing resin as a vehicle and a thermoplastic resin and/or a plasticizer.

Meanwhile, in the case of forming a coating film at a portion where friction with a liquid (for example, seawater) occurs, for example, on a ship, from the viewpoint of reducing fuel consumption for navigation and energy saving of the ship, reducing frictional resistance with the liquid by the coating film is desired.

As a paint having a capability of reducing frictional resistance with a liquid (hereinafter also referred to as "low friction performance"), WO 2005/116155 (PTD 2) discloses a coating composition containing a vehicle resin and specific organic polymer particles.

CITATION LIST

Patent Document

PTD 1: WO 2011/046086
PTD 2: WO 2005/116155

SUMMARY OF INVENTION

Technical Problems

A first object of the present invention is to provide a coating composition from which a coating film excellent in low friction performance and adhesion to a substrate (a surface on which the coating composition is applied) can be formed.

A second object of the present invention is to provide a coating composition from which a coating film excellent in low friction performance and adhesion to a substrate can be formed and which is excellent in a defoaming property.

A third object of the present invention is to provide to a coating film formed from the coating composition, a composite coating film including the coating film, and an in-water structure and a ship provided with the coating film or the composite coating film.

Solutions to Problems

The present invention provides the following coating composition, coating film, composite coating film, in-water structure, and ship.

[1] A coating composition containing a silicon atom-containing resin and a defoaming agent,
in which
the silicon atom-containing resin includes a constituent unit (A) derived from a monomer (a) having at least one kind of silicon atom-containing group selected from the group consisting of a group represented by a formula (I) below, a group represented by a formula (II) below, a group represented by a formula (III) below, and a group represented by a formula (IV) below,
the monomer (a) has a molecular weight of greater than or equal to 400 and less than or equal to 2500, and
a content of the defoaming agent is greater than or equal to 0.7 parts by mass and less than or equal to 24 parts by mass with respect to 100 parts by mass of the silicon atom-containing resin:

[Chemical formula 1]

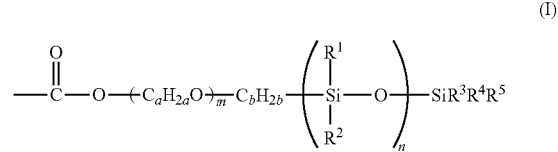

(I)

[in the formula (I), a and b each independently represent an integer of 2 to 5, m represents an integer of 0 to 50, and n represents an integer of 3 to 80; and $R^1$ to $R^5$ each independently represent an alkyl group, an alkoxy group, a phenyl group, a substituted phenyl group, a phenoxy group, or a substituted phenoxy group];

[Chemical formula 2]

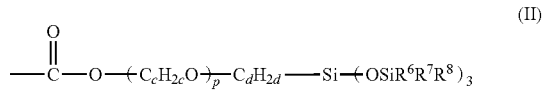

(II)

[in the formula (II), c and d each independently represent an integer of 2 to 5, and p represents an integer of 0 to 50; $R^6$, $R^7$, and $R^8$ each independently represent an alkyl group, $R^a$, or $R^b$;
$R^a$ is

[Chemical formula 3]

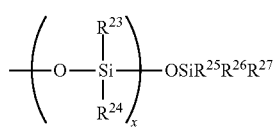

(wherein x represents an integer of 0 to 20; and $R^{23}$ to $R^{27}$ are the same or different and each represent an alkyl group); and $R^b$ is

[Chemical formula 4]

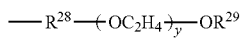

(wherein y represents an integer of 1 to 20; and $R^{28}$ and $R^{29}$ are the same or different and each represent an alkyl group)];

[Chemical formula 5]

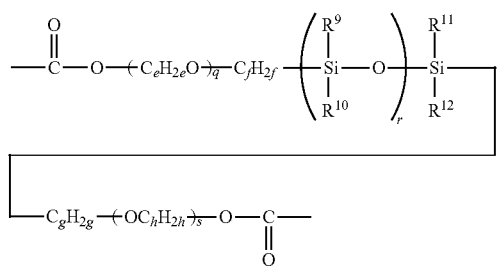

[in the formula (III), e, f, g, and h each independently represent an integer of 2 to 5, q and s each independently represent an integer of 0 to 50, and r represents an integer of 3 to 80; and $R^9$ to $R^{12}$ each independently represent an alkyl group, an alkoxy group, a phenyl group, a substituted phenyl group, a phenoxy group, or a substituted phenoxy group]; and

[Chemical formula 6]

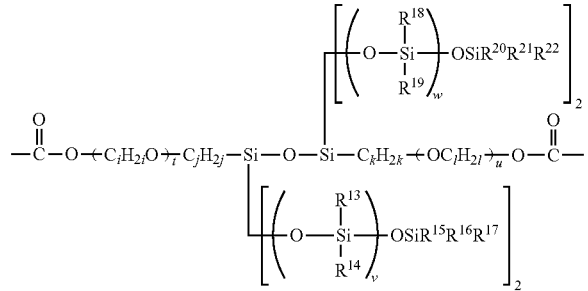

[in the formula (IV), i, j, k, and l each independently represent an integer of 2 to 5, t and u each independently represent an integer of 0 to 50, and v and w each independently represent an integer of 0 to 20; and $R^{13}$ to $R^{22}$ are the same or different and each represent an alkyl group].

[2] The coating composition according to [1], in which the monomer (a) is at least one kind selected from the group consisting of a monomer (a1) represented by a formula (I') below, a monomer (a2) represented by a formula (II') below, a monomer (a3) represented by a formula (III') below, and a monomer (a4) represented by a formula (IV') below:

[Chemical formula 7]

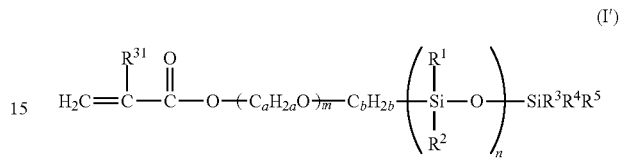

[in the formula (I'), $R^{31}$ represents a hydrogen atom or a methyl group, and a, b, m, n and $R^1$ to $R^5$ represent the same meaning as previously mentioned];

[Chemical formula 8]

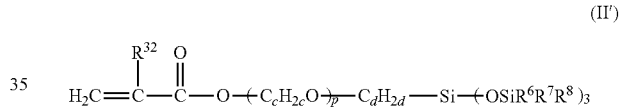

[in the formula (II'), $R^{32}$ represents a hydrogen atom or a methyl group, and c, d, p, and $R^6$ to $R^8$ represent the same meaning as previously mentioned];

[Chemical formula 9]

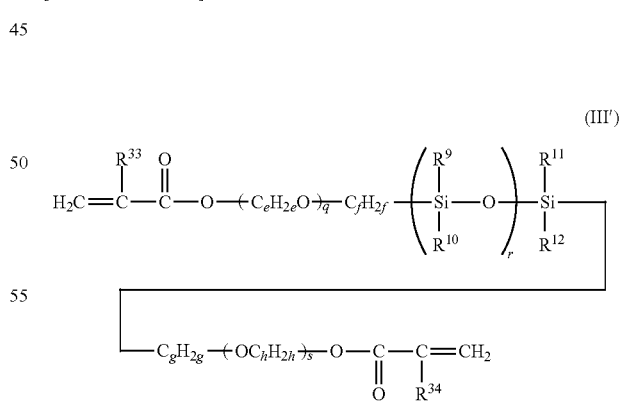

[in the formula (III'), $R^{33}$ and $R^{34}$ each independently represent a hydrogen atom or a methyl group, and e, f, g, h, q, r, s and $R^9$ to $R^{12}$ represent the same meaning as previously mentioned]; and

[Chemical formula 10]

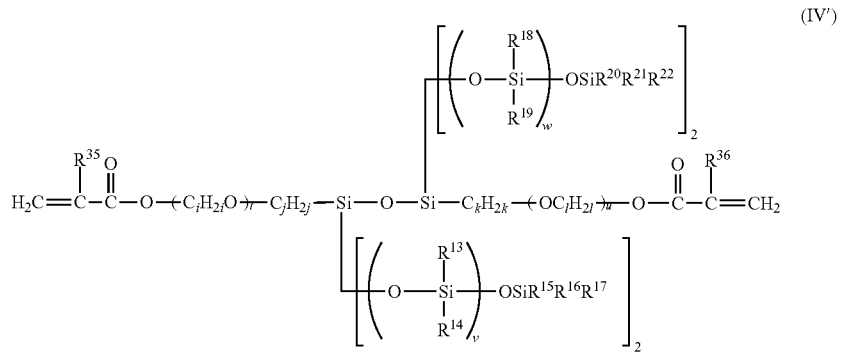

(IV')

[in the formula (IV'), $R^{35}$ and $R^{36}$ each independently represent a hydrogen atom or a methyl group, and i, j, k, l, t, u, v, w and $R^{13}$ to $R^{22}$ represent the same meaning as previously mentioned].

[3] The coating composition according to [1] or [2], in which the silicon atom-containing resin further includes a constituent unit (B) derived from a monomer (b) having at least one kind of metal atom-containing group selected from the group consisting of a group represented by a formula (V) below and a group represented by a formula (VI) below:

[Chemical formula 11]

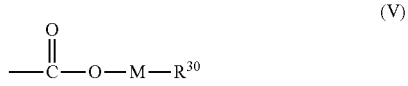

(V)

[in the formula (V). M represents a divalent metal atom, and $R^{30}$ represents an organic acid residue or an alcohol residue]; and

[Chemical formula 12]

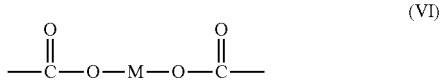

(VI)

[in the formula (VI), M represents a divalent metal atom].

[4] The coating composition according to [3], in which the monomer (b) is at least one kind selected from the group consisting of a monomer (b1) represented by a formula (V') below and a monomer (b2) represented by a formula (VI') below:

[Chemical formula 13]

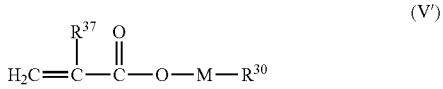

(V')

[in the formula (V'), $R^{37}$ represents a hydrogen atom or a methyl group, and M and $R^{30}$ represent the same meaning as previously mentioned]; and

[Chemical formula 14]

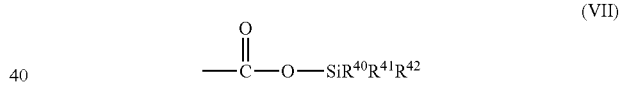

(VI')

[in the formula (VI'), $R^{38}$ and $R^{39}$ each independently represent a hydrogen atom or a methyl group, and M represents the same meaning as previously mentioned].

[5] The coating composition according to any one of [1] to [4], in which the silicon atom-containing resin further includes a constituent unit (C) derived from a monomer (c) having a group represented by a formula (VII) below:

[Chemical formula 15]

$$-\overset{O}{\overset{\|}{C}}-O-SiR^{40}R^{41}R^{42}$$

(VII)

[in the formula (VII), $R^{40}$, $R^{41}$ and $R^{42}$ are the same or different and each represent a hydrocarbon residue having 1 to 20 carbon atoms].

[6] The coating composition according to [5], in which the monomer (c) is a monomer (c1) represented by a formula (VII') below:

[Chemical formula 16]

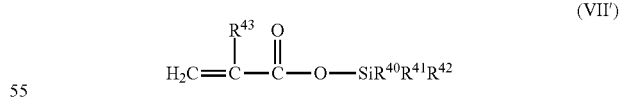

(VII')

[in the formula (VII'), $R^{43}$ represents a hydrogen atom or a methyl group, and $R^{40}$ to $R^{42}$ represent the same meaning as previously mentioned].

[7] The coating composition according to any one of [1] to [6], in which the defoaming agent includes a silicon-based defoaming agent.

[8] The coating composition according to [7], in which the silicon-based defoaming agent is a fluorine-modified silicon-based defoaming agent.

[9] A coating film formed from the coating composition according to any one of [1] to [8].

[10] A composite coating film including a primer coating film formed from an antirust paint, and a coating film formed from the coating composition according to any one of [1] to [8] and overlaid on the primer coating film.

[11] The composite coating film according to [10], wherein the composite coating film further comprises an intermediate coating film between the primer coating film and the coating film, and the intermediate coating film is formed on an entire or part of a surface of the primer coating film.

[12] An in-water structure having the coating film according to [9] or the composite coating film according to [10] or [11].

[13] A ship having the coating film according to [9] or the composite coating film according to [10] or [11].

Advantageous Effects of Invention

According to the present invention, a coating composition from which a coating film excellent in low friction performance and adhesion to a substrate can be formed can be provided.

According to the present invention, a coating composition from which a coating film excellent in low friction performance and adhesion to a substrate can be formed and which is excellent in a defoaming property can be provided.

According to the present invention, a coating film formed from the coating composition, a composite coating film including the coating film, and an in-water structure and a ship provided with the coating film or the composite coating film can be provided.

DESCRIPTION OF EMBODIMENTS

A coating composition of the present invention contains a specific silicon atom-containing resin that will be described later serving as a vehicle component, and a defoaming agent. The content of the defoaming agent is greater than or equal to 0.7 parts by mass and less than or equal to 24 parts by mass with respect to 100 parts by mass of the silicon atom-containing resin.

The coating composition of the present invention contains a predetermined amount of the defoaming agent and also contains the specific silicon atom-containing resin, and thus can exhibit a good defoaming property. "Defoaming property" means a property capable of reducing air bubbles in a coating film formed from the coating composition.

In general, it is preferable that a coating composition exhibits a good defoaming property even after being stored for a certain period of time. The coating composition of the present invention can exhibit a good defoaming property even after being stored for a certain period of time.

The present invention is based on a surprising finding that a combination of a specific silicon atom-containing resin and a specific amount of defoaming agent brings about both of excellent low friction performance of the coating film and excellent adhesion of the coating film to the substrate in addition to an excellent defoaming property. That is, the present invention is based on a surprising finding that, in the case of using a specific silicon atom-containing resin as a vehicle component, by using an appropriate amount of defoaming agent together, not only a defoaming property normally obtained by using a defoaming agent but also low friction performance of the coating film and adhesion of the coating film to the substrate can be improved.

Further, since the coating composition of the present invention contains the specific silicon atom-containing resin as a vehicle component, a coating film exhibiting an antifouling property can be formed. Therefore, the coating composition of the present invention can be suitably used as an antifouling coating composition for stain-proofing a surface of a ship or a surface or an inner surface of an in-water structure.

Examples of the in-water structure include various fish nets such as fish nets for farming and other fishing equipment; harbor facilities; oilfences; intake equipment of an electric generation plant or the like; piping such as water conduits for cooling; bridges, buoyage; industrial water system facilities; and submarine bases.

Since the coating composition of the present invention contains the specific silicon atom-containing resin as a vehicle component, a coating film exhibiting a good antifouling property for a long period can be formed.

<Silicon Atom-Containing Resin>

The silicon atom-containing resin contained in the coating composition of the present invention contains a constituent unit (A).

The constituent unit (A) is a constituent unit derived from a monomer (a) including at least one kind of a silicon atom-containing group selected from the group consisting of a group represented by the formula (I) above, a group represented by the formula (II) above, a group represented by the formula (III) above, and a group represented by the formula (IV) above.

(1) Silicon Atom-Containing Group

The silicon atom-containing group included in the monomer (a) is at least one kind selected from the group consisting of a group represented by the formula (I), a group represented by the formula (II), a group represented by the formula (III), and a group represented by the formula (IV).

In the formula (I), a and b each independently represent an integer of 2 to 5, m represents an integer of 0 to 50, and n represents an integer of 3 to 80. $R^1$ to $R^5$ each independently represent an alkyl group, an alkoxy group, a phenyl group, a substituted phenyl group, a phenoxy group, or a substituted phenoxy group.

In the formula (II), c and d each independently represent an integer of 2 to 5, and p represents an integer of 0 to 50. $R^6$, $R^7$, and $R^8$ each independently represent an alkyl group, $R^a$, or $R^b$.

In $R^a$, x represents an integer of 0 to 20. $R^{23}$ to $R^{27}$ are the same or different and each represent an alkyl group.

In $R^b$, y represents an integer of 1 to 20. $R^{28}$ to $R^{29}$ are the same or different and each represent an alkyl group.

In the formula (III), e, f, g, and h each independently represent an integer of 2 to 5, q and s each independently represent an integer of 0 to 50, and r represents an integer of 3 to 80. $R^9$ to $R^{12}$ each independently represent an alkyl group, an alkoxy group, a phenyl group, a substituted phenyl group, a phenoxy group, or a substituted phenoxy group.

In the formula (IV), i, j, k, and l each independently represent an integer of 2 to 5, t and u each independently represent an integer of 0 to 50, and v and w each independently represent an integer of 0 to 20. $R^{13}$ to $R^{22}$ are the same or different and each represent an alkyl group.

Detailed description of a to n, p to y, and $R^1$ to $R^{29}$ will be given later.

The silicon atom-containing resin may include two or more kinds of silicon atom-containing groups selected from the group consisting of a group represented by the formula (I), a group represented by the formula (II), a group represented by the formula (III), and a group represented by the formula (IV). In this case, the silicon atom-containing resin may include two or more kinds of groups represented by the formula (I), two or more kinds of groups represented by the formula (II), two or more kinds of groups represented by the formula (III), and/or two or more kinds of groups represented by the formula (IV).

One preferable example of the silicon atom-containing resin is a (meth)acrylic resin including a silicon atom-containing group.

"(Meth)acrylic" refers to at least one of methacrylic and acrylic.

(2) Monomer (a)

The monomer (a) is preferably at least one kind selected from the group consisting of a monomer (a1) represented by the formula (I'), a monomer (a2) represented by the formula (II'), a monomer (a3) represented by the formula (III'), and a monomer (a4) represented by the formula (IV'). By polymerization of the monomer composition containing such a monomer (a), a silicon atom-containing resin that is a (meth)acrylic resin including a constituent unit (A) derived from the monomer (a) selected from the group consisting of the monomer (a1), the monomer (a2), the monomer (a3) and the monomer (a4) can be obtained. This silicon atom-containing resin includes at least one kind of silicon atom-containing group selected from the group consisting of a group represented by the formula (I), a group represented by the formula (II), a group represented by the formula (III), and a group represented by the formula (IV).

The silicon atom-containing resin may include two or more kinds of constituent units (A) derived from the monomer (a).

In the formula (I'), $R^{31}$ represents a hydrogen atom or a methyl group, and a, b, m, n and $R^1$ to $R^5$ represent the same meaning as previously mentioned.

In the formula (II'), $R^{32}$ represents a hydrogen atom or a methyl group, and c, d, p, and $R^6$ to $R^8$ represent the same meaning as previously mentioned.

In the formula (III'), $R^{33}$ and $R^{34}$ each independently represent a hydrogen atom or a methyl group, and e, f, g, h, q, r, s and $R^9$ to $R^{12}$ represent the same meaning as previously mentioned.

In the formula (IV'), $R^{35}$ and $R^{36}$ each independently represent a hydrogen atom or a methyl group, and i, j, k, l, t, u, v, w and $R^{13}$ to $R^{22}$ represent the same meaning as previously mentioned.

The monomer (a1) represented by the formula (I'), the monomer (a2) represented by the formula (II'), the monomer (a3) represented by the formula (III'), and the monomer (a4) represented by the formula (IV') are silicon atom-containing polymerizable monomers respectively including a group represented by the formula (I), a group represented by the formula (II), a group represented by the formula (III), and a group represented by the formula (IV).

The monomer (a1) is represented by the formula (I'). By using the monomer (a1) as the monomer (a), a silicon atom-containing resin that is a (meth)acrylic resin having a silicon atom-containing group represented by the formula (I) in the side chain is obtained.

The silicon atom-containing resin may include two or more kinds of constituent units derived from the monomer (a1).

As the monomer (a), a monomer (a) having a molecular weight of greater than or equal to 400 and less than or equal to 2500 is used. This is advantageous for providing a coating composition from which a coating film excellent in low friction performance and adhesion to a substrate, and can be advantageous for providing a coating composition excellent in a defoaming property as well as excellent in low friction performance and adhesion to a substrate, on the premise that the silicon atom-containing resin includes the predetermined silicon atom-containing group and the predetermined amount of defoaming agent is contained in the coating composition.

When comparing a coating composition for which a monomer (a) having a molecular weight of greater than or equal to 400 and less than or equal to 2500 is used with a coating composition for which a monomer having a molecular weight of neither greater or equal to 400 nor less than or equal to 2500, the former can be superior to the latter in one or more, two or more, or all of the low friction performance, the adhesion to the substrate, and the defoaming property.

The molecular weight of the monomer (a) is preferably greater than or equal to 800 and less than or equal to 1500.

The monomer (a) may be a mixture of two or more kinds monomers belonging to the monomer (a), and in this case, the molecular weight may be an average molecular weight thereof.

In the formula (I') [the same applies to the formula (I)], a is preferably 2 or 3.

b is preferably 2 or 3.

m is preferably greater than or equal to 0 and less than or equal to 25, and more preferably greater than or equal to 0 and less than or equal to 20, from the viewpoint of water resistance, the adhesion to the substrate, and the like of the coating film. m may be greater than or equal to 3 or greater than or equal to 5, and less than or equal to 10 or less than or equal to 8.

n is preferably greater than or equal to 5 and less than or equal to 50, more preferably greater than or equal to 8 and less than or equal to 40, and may be less than or equal to 20 or less than or equal to 10, from the viewpoint of antifouling property of the coating film and solubility in common organic solvents.

Examples of a substituent of the substituted phenyl group and substituted phenoxy group in $R^1$ to $R^5$ include an alkyl group and a halogen atom.

$R^1$ to $R^5$ are each preferably an alkyl group, more preferably an alkyl group having 1 to 6 carbon atoms, still more preferably an alkyl group having 1 to 4 carbon atoms such as a methyl group, an ethyl group, a n-propyl group, an iso-propyl group, a n-butyl group, an iso-butyl group, a sec-butyl group, or a tert-butyl group, and particularly preferably a methyl group or an ethyl group.

Examples of the monomer (a1) include "FM-0711" (product name) manufactured by JNC Corporation, and "X-22-174 BX", "X-22-174 ASX", and "X-22-2404" (product names) manufactured by Shin-Etsu Chemical Co., Ltd.

The monomer (a2) is represented by the formula (II'). By using the monomer (a2) as the monomer (a), a silicon atom-containing resin that is a (meth)acrylic resin having a silicon atom-containing group represented by the formula (II) in the side chain is obtained.

The silicon atom-containing resin may include two or more kinds of constituent units derived from the monomer (a2).

In the formula (II') [the same applies to the formula (II)], c is preferably 2 or 3.

d is preferably 2 or 3.

p is preferably greater than or equal to 0 and less than or equal to 25, and more preferably greater than or equal to 0 and less than or equal to 20, from the viewpoint of water resistance, the adhesion to the substrate, and the like of the coating film. p may be greater than or equal to 3 or greater than or equal to 5, and less than or equal to 10 or less than or equal to 8.

x and y are each preferably greater than or equal to 0 and less than or equal to 10, and more preferably greater than or equal to 0 and less than or equal to 5, from the viewpoint of solubility in common organic solvents.

Alkyl groups in $R^6$ to $R^8$ and $R^{23}$ to $R^{29}$ are each preferably an alkyl group having 1 to 6 carbon atoms, more preferably an alkyl group having 1 to 4 carbon atoms such as a methyl group, an ethyl group, a n-propyl group, a iso-propyl group, a n-butyl group, an iso-butyl group, a sec-butyl group, or a tert-butyl group, and still more preferably a methyl group or an ethyl group.

It is preferable that all of $R^6$ to $R^8$ are alkyl groups.

Examples of the monomer (a2) include "TM-0701" (product name) manufactured by JNC Corporation.

The monomer (a3) is represented by the formula (III'). By using the monomer (a3) as the monomer (a), a silicon atom-containing resin that is a (meth)acrylic resin including a silicon atom-containing group represented by the formula (III) (this silicon atom-containing group is a cross-linking group crosslinking polymer main chains) is obtained.

The silicon atom-containing resin may include two or more kinds of constituent units derived from the monomer (a3).

In the formula (III') [the same applies to the formula (III)], e and h are each preferably 2 or 3.

f and g are each preferably 2 or 3.

q and s are each preferably greater than or equal to 0 and less than or equal to 30, more preferably greater than or equal to 0 and less than or equal to 25, and still more preferably greater than or equal to 0 and less than or equal to 20, from the viewpoint of the water resistance, the adhesion to the substrate, and the like of the coating film. q and s may be each greater than or equal to 3 or greater than or equal to 5, and less than or equal to 10 or less than or equal to 8.

r is preferably greater than or equal to 5 and less than or equal to 50, more preferably greater than or equal to 8 and less than or equal to 40, and may be less than or equal to 20 or less than or equal to 10, from the viewpoint of antifouling property of the coating film, solubility in common organic solvents, and the like.

Examples of a substituent of the substituted phenyl group and substituted phenoxy group in $R^9$ to $R^{12}$ include an alkyl group and a halogen atom.

$R^9$ to $R^{12}$ are each preferably an alkyl group, more preferably an alkyl group having 1 to 6 carbon atoms, still more preferably an alkyl group having 1 to 4 carbon atoms such as a methyl group, an ethyl group, a n-propyl group, an iso-propyl group, a n-butyl group, an iso-butyl group, a sec-butyl group, or a tert-butyl group, and particularly preferably a methyl group or an ethyl group.

Examples of the monomer (a3) include "FM-7711" (product name) manufactured by JNC Corporation, and "X-22-164A" and "X-22-164AS" (product names) manufactured by Shin-Etsu Chemical Co., Ltd.

The monomer (a4) is represented by the formula (IV'). By using the monomer (a4) as the monomer (a), a silicon atom-containing resin that is a (meth)acrylic resin including a silicon atom-containing group represented by the formula (IV) (this silicon atom-containing group is a cross-linking group crosslinking polymer main chains.) is obtained.

The silicon atom-containing resin may include two or more kinds of constituent units derived from the monomer (a4).

In the formula (IV') [the same applies to the formula (IV)], i and l are each preferably 2 or 3.

j and k are each preferably 2 or 3.

t and u are each preferably greater than or equal to 0 and less than or equal to 30, more preferably greater than or equal to 0 and less than or equal to 25, and still more preferably greater than or equal to 0 and less than or equal to 20, from the viewpoint of the water resistance, the adhesion to the substrate, and the like of the coating film. q and s may be each greater than or equal to 3 or greater than or equal to 5, and less than or equal to 10 or less than or equal to 8.

v and w are each preferably greater than or equal to 0 and less than or equal to 10, more preferably greater than or equal to 0 and less than or equal to 5, and may be greater than or equal to 1 and less than or equal to 3, from the viewpoint of antifouling property of the coating film, solubility in common organic solvents, and so forth.

Alkyl groups in $R^{13}$ to $R^{22}$ are each preferably an alkyl group having 1 to 6 carbon atoms, more preferably an alkyl group having 1 to 4 carbon atoms such as a methyl group, an ethyl group, a n-propyl group, an iso-propyl group, a n-butyl group, an iso-butyl group, a sec-butyl group, or a tert-butyl group, and still more preferably a methyl group or an ethyl group.

Examples of the monomer (a4) include products previously sold by Nippon Unicar Co., Ltd. Silicone business of Nippon Unicar Co., Ltd. was assigned to Dow Corning Toray Co., Ltd. in 2004, and now equivalent products are available from the assignee.

a to n, p to y and $R^1$ to $R^{29}$ are appropriately selected so that the molecular weight of the monomer (a) is greater than or equal to 400 and less than or equal to 2500 with reference to the above description.

The silicon atom-containing resin may include two or more kinds of constituent units derived from the monomer (a) selected from the monomer (a1), the monomer (a2), the monomer (a3), and the monomer (a4), from the viewpoint of antifouling property, low friction performance and/or excellent adhesion to the substrate.

Among these, as one preferred embodiment, an embodiment using both a polymerizable monomer containing (meth)acryl-modified silicon atom at one terminal [monomer (a1) and/or (a2)] and a polymerizable monomer containing (meth)acryl-modified silicon atom at both terminals [monomer (a3) and/or (a4)] can be recited.

From the viewpoint of antifouling property, low friction performance and/or excellent adhesion the substrate, the content of the constituent unit (A) derived from the monomer (a) is preferably greater than or equal to 5% by mass and less than or equal to 80% by mass, more preferably greater than or equal to 10% by mass and less than or equal to 70% by mass, and still more preferably greater than or equal to 20% by mass and less than or equal to 60% by mass in all constituent units contained in the silicon atom-containing resin.

When the content of the constituent unit (A) is greater than or equal to 5% by mass, the coating composition can exhibit a sufficient antifouling property even when the antifouling agent is not additionally contained. The content of the constituent unit (A) being less than or equal to 80° by mass is advantageous for comprehensively enhancing the antifouling property, low friction performance, and adhesion to the substrate.

(3) Monomer (b)

The silicon atom-containing resin may further include a constituent unit (B) derived from a monomer (b) including at least one kind of metal atom-containing group selected from the group consisting of a group represented by the formula (V) and a group represented by the formula (VI).

When the silicon atom-containing resin further include the constituent unit (B) in addition to the constituent unit (A), it is possible to further improve the antifouling property, low friction performance and/or adhesion to the substrate of the coating film.

The silicon atom-containing resin may include both a group represented by the formula (V) and a group represented by the formula (VI).

The monomer (b) is preferably at least one kind selected from the group consisting of a monomer (b1) represented by the formula (V') and a monomer (b2) represented by the formula (VI'). By polymerization of the monomer composition containing such a monomer (b), a silicon atom-containing resin that is a (meth)acrylic resin including a constituent unit (B) derived from the monomer (b) selected from the group consisting of the monomer (b1) and the monomer (b2) can be obtained. This silicon atom-containing resin includes at least one kind of metal atom-containing group selected from the group consisting of a group represented by the formula (V) and a group represented by the formula (VI).

The silicon atom-containing resin may include two or more kinds of constituent units (B) derived from the monomer (b).

The divalent metal atom M in the formula (V') [the same applies to formula (V)] and the formula (VI') [the same applies to formula (VI)] is, for example, Mg, Zn, or Cu, and is preferably Zn or Cu.

In the formula (V') [the same applies to formula (V)], $R^{30}$ is preferably an organic acid residue.

The monomer (b1) is represented by the formula (V'). By using the monomer (b1) as the monomer (b), a silicon atom-containing resin that is a (meth)acrylic resin further including a metal atom-containing group represented by the formula (V) is obtained.

In $R^{30}$, as an organic acid forming an organic acid residue, for example, monobasic organic acids such as acetic acid, monochloroacetic acid, monofluoroacetic acid, propionic acid, caproic acid, caprylic acid, 2-ethylhexyl acid, capric acid, versatic acid, isostearic acid, palmitic acid, cresotinic acid, oleic acid, elaidic acid, linoleic acid, linolenic acid, stearolic acid, ricinoleic acid, ricinoelaidic acid, brassidic acid, erucic acid, α-naphthoic acid, β-naphthoic acid, benzoic acid, 2,4,5-trichlorophenoxyacetic acid, 2,4-dichlorophenoxyacetic acid, quinoline carboxylic acid, nitrobenzoic acid, nitronaphthalenecarboxylic acid, and pyruvic acid are recited.

Particularly, it is preferable that the organic acid residue is a fatty acid organic acid residue because a coating film without cracking and peeling tends to be kept for a long period of time. In particular, zinc oleate (meth)acrylate or zinc versatate (meth)acrylate having high flexibility is preferably used as the monomer (b1).

As other preferred organic acids, monobasic cyclic organic acids other than aromatic organic acids can be recited. As monobasic cyclic organic acids, for example, organic acids having a cycloalkyl group such as naphthenic acid, resin acids such as tricyclic resin acids, and salts thereof can be recited.

As the tricyclic resin acids, for example, monobasic acids having a diterpene hydrocarbon skeleton can be recited. As the monobasic acids having a diterpene hydrocarbon skeleton, for example, compounds having abietane, pimaran, isopimarane, or labdan skeleton can be recited. More concretely, for example, abietic acid, neoabietic acid, dehydroabietic acid, hydrogenated abietic acid, palustric acid, pimaric acid, isopimaric acid, levopimaric acid, dextropimaric acid, sandaracopimaric acid, and salts thereof are recited. Among these, abietic acid, hydrogenated abietic acid, and salts thereof are preferable from the viewpoint of antifouling property or the like of the coating film.

The monobasic cyclic organic acid does not have to be highly purified, and, for example, pine resin, resin acid of pine and the like may be used. As such, for example, rosin, hydrogenated rosin, disproportionated rosin, and naphthenic acid can be recited. Examples of the rosin include gum rosin, wood rosin, and tall oil rosin. Rosin, hydrogenated rosin, and disproportionated rosin are preferred in that they are cheap, easily available, and excellent in handleability, and are likely to exert a long-term antifouling property.

The acid value of the monobasic cyclic organic acid is preferably greater than or equal to 100 mg KOH/g and less than or equal to 220 mg KOH/g, more preferably greater than or equal to 120 mg KOH/g and less than or equal to 190 mg KOH/g, and further preferably greater than or equal to 140 mg KOH/g and less than or equal to 185 mg KOH/g.

When the monobasic cyclic organic acid having an acid value within the above range is used as a monobasic cyclic organic acid forming $R^{30}$, there is a tendency that a good antifouling property of the coating film can be maintained for a longer period of time.

An organic acid residue of the monomer (b1) may be formed of only one kind of organic acid or two or more kinds of organic acids.

As a production method of the monomer (b1) having an organic acid residue as $R^{30}$, for example, a method of reacting an inorganic metal compound, with a carboxyl group-containing radical polymerizable monomer such as (meth)acrylic acid, and a nonpolymerizable organic acid (an organic acid forming the organic acid residue) in an organic solvent containing an alcoholic compound can be recited.

The constituent unit (B) derived from the monomer (b1) may also be formed by a method of reacting a resin obtainable by polymerization of a monomer composition containing a carboxyl group-containing radical polymerizable monomer such as (meth)acrylic acid, with a metal compound, and a nonpolymerizable organic acid (an organic acid forming the organic acid residue).

The monomer (b2) is represented by the formula (VI'). By using the monomer (b2) as the monomer (b), a silicon atom-containing resin that is a (meth)acrylic resin further including a metal atom-containing group represented by the formula (VI) (this metal atom-containing group is a crosslinking group crosslinking polymer main chains) is obtained.

Examples of the monomer (b2) include magnesium acrylate [$(CH_2=CHCOO)_2Mg$], magnesium methacrylate [$(CH_2=C(CH_3)COO)_2Mg$], zinc acrylate [$(CH_2=CHCOO)_2Zn$], zinc methacrylate [$(CH_2=C(CH_3)COO)_2Zn$], copper acrylate [$(CH_2—CHCOO)_2Cu$], and copper methacrylate [$(CH_2—C(CH_3)COO)_2Cu$]. These may be used alone or in combination of two or more kinds that are appropriately selected as necessary.

As a production method of the monomer (b2), for example, a method of reacting a polymerizable unsaturated organic acid such as (meth)acrylic acid with a metal compound in an organic solvent containing an alcoholic compound together with water can be recited. In this case, it is preferred to adjust the content of water in the reactant to greater than or equal to 0.01% by mass and less than or equal to 30% by mass.

The silicon atom-containing resin may include both of a constituent unit derived from the monomer (b1) and a constituent unit derived from the monomer (b2).

In the case where the silicon atom-containing resin contains the constituent unit (B), from the viewpoint of improving antifouling property, low friction performance and/or improving adhesion to the substrate, the content of the constituent unit (B) is preferably greater than or equal to 2% by mass and less than or equal to 30% by mass, more preferably greater than or equal to 4% by mass and less than or equal to 25% by mass, and still more preferably greater than or equal to 6% by mass and less than or equal to 20/o by mass in all constituent units contained in the silicon atom-containing resin.

When the content of the constituent unit (B) is greater than or equal to 2% by mass, it is possible to further improve the antifouling property, low friction performance and/or adhesion to the substrate of the coating film. The content of the constituent unit (B) being less than or equal to 30% by mass is advantageous for comprehensively enhancing the antifouling property, low friction performance, and adhesion to the substrate.

In the case where the silicon atom-containing resin contains the constituent unit (B), a ratio of the content of the constituent unit (B) to the total content of the constituent unit (A) and the constituent unit (B) [(B)/((A)+(B))] is preferably greater than or equal to 10% by mass and less than or equal to 70% by mass, more preferably greater than or equal to 10% by mass and less than or equal to 50% by mass, and still more preferably greater than or equal to 15% by mass and less than or equal to 40% by mass in percentage. This is advantageous for comprehensively enhancing the antifouling property, low friction performance, and adhesion to the substrate.

(4) Monomer (c)

The silicon atom-containing resin may further include a constituent unit (C) derived from a monomer (c) including a group represented by the formula (VII). When the silicon atom-containing resin further includes the constituent unit (C) in addition to the constituent unit (A), it is possible to further improve the antifouling property of the coating film.

The monomer (c) is preferably a monomer (c1) represented by the formula (VII') By polymerization of the monomer composition containing the monomer (c1), a silicon atom-containing resin that is a (meth)acrylic resin including a constituent unit (C) derived from the monomer (c1) can be obtained. This silicon atom-containing resin includes a group represented by the formula (VII).

The silicon atom-containing resin may include two or more kinds of constituent units (C) derived from the monomer (c).

In the formula (VII') [the same applies to the formula (VII)], $R^{40}$, $R^{41}$ and $R^{42}$ are the same or different and each represent a hydrocarbon residue having 1 to 20 carbon atoms (monovalent hydrocarbon group). The silicon atom-containing resin may include two or more kinds of groups represented by the formula (VII).

As the hydrocarbon residue having 1 to 20 carbon atoms, for example, a linear or branched alkyl group having 20 or less carbon atoms such as a methyl group, an ethyl group, a n-propyl group, an iso-propyl group, a n-butyl group, an iso-butyl group, a sec-butyl group, a tert-butyl group, a pentyl group, a hexyl group, a heptyl group, an octyl group, a nonyl group, a decyl group, an undecyl group, a dodecyl group, a tridecyl group, or a tetradecyl group; a cyclic alkyl group that may have a substituent such as a cyclohexyl group or a substituted cyclohexyl group; and an aryl group that may have a substituent such as an aryl group or a substituted aryl group can be recited.

Examples of the cyclic alkyl group that may have a substituent include a cyclic alkyl group substituted with a halogen, an alkyl group having up to about 18 carbon atoms, an acyl group, a nitro group, or an amino group.

Examples of the aryl group that may have a substituent include an aryl group substituted with a halogen, an alkyl group having up to about 18 carbon atoms, an acyl group, a nitro group, or an amino group.

Among these, it is preferable that one or more of $R^{40}$, $R^{41}$ and $R^{42}$ is an iso-propyl group, and it is more preferable that all of $R^{40}$, $R^{41}$ and $R^{42}$ are iso-propyl groups for maintaining a good antifouling property of the coating film for a long period.

In the case where the silicon atom-containing resin contains the constituent unit (C), from the viewpoint of improving the antifouling property, the content of the constituent unit (C) is preferably greater than or equal to 2% by mass and less than or equal to 55% by mass, more preferably greater than or equal to 5% by mass and less than or equal to 50% by mass, and still more preferably greater than or equal to 10% by mass and less than or equal to 45% by mass in all constituent units contained in the silicon atom-containing resin.

When the content of the constituent unit (C) is greater than or equal to 2% by mass, it is possible to further improve the antifouling property of the coating film. The content of the constituent unit (C) being less than or equal to 55% by mass is advantageous for comprehensively enhancing the antifouling property, low friction performance, and adhesion to the substrate.

In the case where the silicon atom-containing resin contains the constituent unit (C), a ratio of the content of the constituent unit (C) to the total content of the constituent unit (A) and the constituent unit (C) [(C)/{(A)+(C)}] is preferably greater than or equal to 10% by mass and less than or equal to 90% by mass, more preferably greater than or equal to 20% by mass and less than or equal to 80% by mass, and still more preferably greater than or equal to 30% by mass and less than or equal to 70% by mass by mass in percentage. This is advantageous for comprehensively enhancing the antifouling property, low friction performance, and adhesion to the substrate.

(5) Other Monomers (d)

The silicon atom-containing resin may contain a constituent unit (D) derived from a monomer (d) other than the monomer (a), the monomer (b), and the monomer (c).

The monomer (d) is not particularly limited insofar as it is an unsaturated monomer capable of copolymerizing with the monomer (a), the monomer (b), and the monomer (c), and for example, (meth)acrylic acid ester monomers such as methyl (meth)acrylate, ethyl (meth)acrylate, 2-methoxyethyl (meth)acrylate, 2-ethoxyethyl (meth)acrylate, phenoxyethyl (meth)acrylate, 2-(2-ethylhexaoxy)ethyl (meth)acrylate, 1-methyl-2-methoxyethyl (meth)acrylate, 3-methoxybutyl (meth)acrylate, 3-methyl-3-methoxybutyl (meth)acrylate, m-methoxyphenyl (meth)acrylate, p-methoxyphenyl (meth)acrylate, o-methoxyphenylethyl (meth)acrylate, m-methoxyphenylethyl (meth)acrylate, p-methoxyphenylethyl (meth)acrylate, n-propyl (meth)acrylate, iso-propyl (meth)acrylate, n-butyl (meth)acrylate, iso-butyl (meth)acrylate, tert-butyl (meth)acrylate, 2-ethylhexyl (meth)acrylate, lauryl (meth)acrylate, stearyl (meth)acrylate, benzyl (meth)acrylate, phenyl (meth)acrylate, isobornyl (meth)acrylate, cyclohexyl (meth)acrylate and glycidyl (meth)acrylate; hydroxy group-containing (meth)acrylic monomers such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate, adducts of 2-hydroxyethyl(meth)acrylate or 2-hydroxypropyl (meth) acrylate, with ethylene oxide, propylene oxide, γ-butyrolactone, ε-caprolactone or the like, dimers or trimers such as 2-hydroxyethyl (meth)acrylate and 2-hydroxypropyl (meth)acrylate; (meth)acrylic monomers having plural hydroxy groups such as glycerol (meth)acrylate; primary and secondary amino group-containing vinyl monomers such as butylaminoethyl (meth)acrylate and (meth)acrylamide; tertiary amino group-containing vinyl monomers such as dimethylaminoethyl (meth)acrylate, diethylaminoethyl (meth)acrylate, dimethylaminopropyl (meth)acrylate, dimethylaminobutyl (meth)acrylate, dibutylaminoethyl (meth)acrylate, dimethylaminoethyl (meth) acrylamide and dimethylaminopropyl (meth)acrylamide; heterocyclic basic monomers such as vinyl pyrrolidone, vinyl pyridine and vinyl carbazole, and other vinyl monomers such as styrene, vinyltoluene, α-methylstyrene, (meth) acrylonitrile, vinyl acetate and vinyl propionate can be recited.

The content of the constituent unit (D) derived from the monomer (d) is normally greater than or equal to 0.1% by mass and less than or equal to 95% by mass, preferably greater than or equal to 5% by mass and less than or equal to 90% by mass, and more preferably greater than or equal to 10% by mass and less than or equal to 70% by mass in all constituent units contained in the silicon atom-containing resin.

When the content of the constituent unit (D) is greater than or equal to 0.1% by mass, it is possible to balance various properties of the resulting coating composition. When the content of the constituent unit (D) is less than or equal to 95% by mass, the coating composition can exhibit a sufficient antifouling property even when the antifouling agent is not additionally contained.

(6) Method of Producing Silicon Atom-Containing Resin

The production method of the silicon atom-containing resin is not particularly limited, and for example, a method of reacting a monomer composition of the aforementioned monomers in the presence of a radical initiator at a reaction temperature of 60 to 180° C. for 5 to 14 hours. Conditions of the polymerization reaction may be appropriately adjusted.

As the radical initiator, for example, 2,2-azobisisobutyronitrile, 2,2-azobis(2,4-dimethylvaleronitrile), 2,2-azobis (2-methylbutyronitrile), benzoyl peroxide, cumene hydroperoxide, lauryl peroxide, di-tert-butylperoxide, tert-butylperoxy-2-ethylhexanoate and the like are recited.

Examples of a polymerization method include a solution polymerization method, an emulsion polymerization method, and a suspension polymerization method that are carried out in an organic solvent. From the viewpoint of production efficiency and the like of the silicon atom-containing resin, the solution polymerization method is preferable.

Examples of the organic solvent include common organic solvents such as toluene, xylene, methyl isobutyl ketone, and n-butyl acetate.

When the monomer (b2) is used, a chain transfer agent may be used to make the coating composition highly solid, to improve the production efficiency, and to suppress generation of cullet at the time of polymerization. As the chain transfer agent, a chain transfer agent other than mercaptan, such as a styrene dimer is preferred from the viewpoint of compatibility with the monomer (b).

The number average molecular weight of the silicon atom-containing resin is usually greater than or equal to 1000 and less than or equal to 100000, preferably greater than or equal to 3000 and less than or equal to 50000, and more preferably greater than or equal to 5000 and less than or equal to 30000.

When the number average molecular weight of the silicon atom-containing resin is greater than or equal to 1000, there is a tendency that the coating film formed from the coating composition can develop an antifouling property. When the number average molecular weight of the silicon atom-containing resin is less than or equal to 100000, there is a tendency that the silicon atom-containing resin is likely to be uniformly dispersed in the coating composition.

The number average molecular weight of the silicon atom-containing resin is a number average molecular weight in terms of polystyrene measured by gel permeation chromatography (GPC).

<Coating Composition>

The coating composition of the present invention contains the silicon atom-containing resin as a vehicle component and the defoaming agent.

(1) Content of Silicon Atom-Containing Resin

The content of the silicon atom-containing resin in the coating composition is preferably greater than or equal to 30% by mass and less than or equal to 99% by mass, more preferably greater than or equal to 40% by mass and less than or equal to 90% by mass, and may be less than or equal to 85% by mass, in the solid content of the coating composition.

When the content of the silicon atom-containing resin is less than 30% by mass, the adhesion of the coating film to the substrate, the low friction performance of the coating film, and the antifouling property of the coating film tend to decrease.

Solids contained in a coating composition refers to the sum of the ingredients other than a solvent contained in the coating composition.

(2) Defoaming Agent

The coating composition of the present invention contains a defoaming agent. The coating composition may contain only one type of defoaming agent or two or more kinds of defoaming agents.

A defoaming agent is an agent having a function of making the surface of foam to be formed nonuniform and suppressing the formation of foam, or an agent having a function of locally thinning the surface of formed foam and breaking the foam.

The content of the defoaming agent is greater than or equal to 0.7 parts by mass and less than or equal to 24 parts by mass with respect to 100 parts by mass of the silicon atom-containing resin, and is preferably less than or equal to 20 parts by mass, more preferably less than or equal to 16 parts by mass, further preferably less than or equal to 14 parts by mass, and particularly preferably less than or equal to 12 parts by mass, from the viewpoint of the adhesion of the coating film to the substrate.

The content of the defoaming agent is preferably greater than or equal to 1 parts by mass, more preferably greater than or equal to 2 parts by mass, further preferably greater than or equal to 3 parts by mass, and particularly preferably greater than or equal to 4 parts by mass with respect to 100 parts by mass of the silicon atom-containing resin, from the viewpoint of the defoaming property and/or the viewpoint of the low friction performance of the coating film. The content of the defoaming agent is also preferably greater than or equal to 5 parts by mass or greater than or equal to 10 parts by mass with respect to 100 parts by mass of the silicon atom-containing resin, from the viewpoint of the defoaming property and/or the viewpoint of the low friction performance of the coating film.

Examples of the defoaming agent include silicon-based defoaming agents and non-silicon-based defoaming agents.

The silicon-based defoaming agent is a defoaming agent containing a polysiloxane having surface activity or a modified product thereof, and the non-silicon-based defoaming agent is a defoaming agent other than a silicon-based defoaming agent (defoaming agent not containing polysiloxane or a modified product thereof).

Examples of the non-silicon-based defoaming agent include higher alcohol-based, higher alcohol derivative-based, fatty acid-based, fatty acid derivative-based, paraffin-based, (meth)acrylic polymer-based, and mineral oil-based defoaming agents.

Examples of the silicon-based defoaming agent include types such as oil types, compound types, self-emulsifying types, and emulsion types.

From the viewpoint of the defoaming property of the coating composition (in particular, defoaming property after storage for a certain period), low friction performance of the coating film and/or adhesion of the coating film to the substrate, the defoaming agent preferably includes a silicon-based defoaming agent, and more preferably only includes a silicon-based defoaming agent. In particular, from the viewpoint of the defoaming property of the coating composition (in particular, defoaming property after storage for a certain period), low friction performance of the coating film and/or adhesion of the coating film to the substrate, the defoaming agent preferably includes a fluorine-modified silicon-based defoaming agent, and more preferably only includes a fluorine-modified silicon-based defoaming agent. The fluorine-modified silicon-based defoaming agent is a defoaming agent containing a fluorine-modified polysiloxane.

As a defoaming agent, a commercially available product may be used.

Examples of commercially available non-silicon-based defoaming agents include mineral oil-based defoaming agents such as "BYK-030" manufactured by BYK; "Disparlon OX68" manufactured by Kusumoto Chemicals Ltd., and "BYK-1790" manufactured by BYK.

Examples of commercially available silicon-based defoaming agents other than fluorine-modified silicon-based defoaming agents include silicone oil-based defoaming agents such as "KF-96" manufactured by Shin-Etsu Chemical Co., Ltd., and "BYK-081" manufactured by BYK.

Examples of commercially available fluorine-modified silicon-based defoaming agents include fluorosilicone oil-based defoaming agents such as "BYK-063" manufactured by BYK, and "FA-630" manufactured by Shin-Etsu Chemical Co., Ltd.

(3) Thermoplastic Resin/Plasticizer

The coating composition may contain a thermoplastic resin and/or a plasticizer. By adding the thermoplastic resin and/or plasticizer, crack resistance of a coating film can be improved Since it becomes possible to control the polishing rate (polishing speed) of the coating film to an appropriate speed, it is advantageous also in the point of the long-term antifouling property of the coating film.

As the thermoplastic resin, for example, chlorinated paraffin; chlorinated polyolefins such as chlorinated rubber, chlorinated polyethylene and chlorinated polypropylene; polyvinyl ether; polypropylene sebacate; partially hydrogenated terphenyl; polyvinyl acetate; poly(meth)acrylic acid alkyl esters such as methyl (meth)acrylate copolymers, ethyl (meth)acrylate copolymers, propyl (meth)acrylate copolymers, butyl (meth)acrylate copolymers and cyclohexyl (meth)acrylate copolymers; polyether polyols; alkyd resins; polyester resins; vinyl chloride resins such as a vinyl chloride-vinyl acetate copolymer, a vinyl chloride-vinyl propionate copolymer, a vinyl chloride-isobutyl vinyl ether copolymer, a vinyl chloride-isopropyl vinyl ether copolymer and a vinyl chloride-ethyl vinyl ether copolymer; silicon oil; fats and oils and purified substances thereof; vaseline; liquid paraffin; rosin, hydrogenated rosin, naphthenic acid, fatty acids and divalent metal salts thereof; and the like can be recited.

Examples of the fats and oils and purified substances thereof include fats and oils that are solid at normal temperature, such as, for example, wax (including animal-derived wax such as bees wax, plant-derived wax and the like) and fats and oils that are liquid at normal temperature such as castor oil.

The thermoplastic resins may be used alone or in combination of two or more kinds.

Among the above, chlorinated paraffin, polyvinyl ether, polyether polyols, rosin, and a vinyl chloride-isobutyl vinyl ether copolymer are particularly preferred, and in particular, chlorinated paraffin, polyvinyl ether, rosin and a vinyl chloride-isobutyl vinyl ether copolymer can be more preferably used because they are suited for adjusting plasticity of a coating film and an exhausted amount of a coating film.

As the plasticizer, for example, phthalate ester plasticizers such as dioctyl phthalate (DOP), dimethyl phthalate, dicyclohexyl phthalate and diisodecyl phthalate (DIDP); aliphatic dibasic acid ester plasticizers such as isobutyl adipate and dibutyl sebacate; glycol ester plasticizers such as diethyleneglycol dibenzoate and pentaerythritol alkyl ester; phosphate ester plasticizers such as tricresyl phosphoric acid (tricresyl phosphate), triaryl phosphoric acid (triaryl phosphate) and trichloroethyl phosphoric acid; epoxy plasticizers such as epoxy soybean oil and octyl epoxystearate; organotin plasticizers such as dioctyl tin laurate and dibutyl tin laurate; trioctyl trimellitate, triacetylene and the like can be recited.

The plasticizers may be used alone or in combination of two or more kinds.

Among these, phthalate ester plasticizers such as dioctyl phthalate (DOP), dimethyl phthalate, dicyclohexyl phthalate and diisodecyl phthalate (DIDP), and phosphate ester plasticizers such as tricresyl phosphoric acid (tricresyl phosphate), triaryl phosphoric acid (triaryl phosphate) and trichloroethyl phosphoric acid are particularly excellent in compatibility with the silicon atom-containing resin and the thermoplastic resin, and are able to improve crack resistance uniformly over the entire coating film, and hence are preferable.

The total content of the thermoplastic resin and/or plasticizer in the coating composition is preferably greater than or equal to 3 parts by mass and less than or equal to 100 parts by mass, more preferably greater than or equal to 5 parts by mass and less than or equal to 50 parts by mass, and further preferably greater than or equal to 5 parts by mass and less than or equal to 30 parts by mass with respect to 100 parts by mass of the silicon atom-containing resin.

When the total content of the thermoplastic resin and/or plasticizer is less than 3 parts by mass with respect to 100 parts by mass of the silicon atom-containing resin, there is a tendency that an effect of improving the crack resistance by addition of the thermoplastic resin and/or plasticizer is not recognized, and there is also a tendency that an effect of improving the long-term antifouling property of the coating film by addition of the thermoplastic resin and/or plasticizer is not recognized.

When the total content of the thermoplastic resin and/or plasticizer exceeds 100 parts by mass with respect to 100 parts by mass of the silicon atom-containing resin, there is a tendency that the adhesion of the coating film to the substrate deteriorates or the antifouling property of the coating film deteriorates.

(4) Antifouling Agent

The coating film obtained from the coating composition of the present invention can exhibit a good antifouling property due to the antifouling effect based on a self-polishing property exhibited by the silicon atom-containing resin.

However, in order to further enhance the antifouling property of the coating film or to further enhance the long-term sustainability of the antifouling property, an antifouling agent may be contained in the coating composition as necessary.

As the antifouling agent, those known in the art may be used without particular limitation, and for example, inorganic compounds, organic compounds containing a metal, and organic compounds not containing a metal can be recited.

Examples of the antifouling agent include metal salts such as zinc oxide; cuprous oxide; manganese ethylene-bis-dithiocarbamate; zinc dimethyldithiocarbamate; 2-methylthio-4-tert-butylamino-6-cyclopropylamino-s-triazine; 2,4,5,6-tetrachloroisophthalonitrile; N,N-dimethyldichlorophenyl urea; zinc ethylene-bis-dithiocarbamate; rhodan copper (cuprous thiocyanate), 4,5-dichloro-2-n-octyl-4-isothiazoline-3-one (4,5,-dichloro-2-n-octyl-3 (2H)isothiazolone); N-(fluorodichloromethylthio)phthalimide; N,N'-dimethyl-N'-phenyl-(N-fluorodichloromethylthio)sulfamide; 2-pyridinethiol-1-oxide zinc salt (zinc pyrithione) and copper salt (copper pyrithione); tetramethylthiuram disulfide; 2,4,6-trichlorophenyl maleimide; 2,3,5,6-tetrachloro-4-(methylsulfonyl)pyridine; 3-iodo-2-propylbutyl carbamate; diiodomethyl-para-trisulfone; phenyl(bispyridyl)bismuth dichloride; 2-(4-thiazolyl)-benzimidazole; triphenylboronpyridine salt; stearylamine-triphenylboron; laurylamine-triphenylboron; bis dimethyl dithiocarbamoyl zinc ethylenebissdithiocarbamate; 1,1-dichloro-N-[(dimethylamino)sulfonyl]-1-fluoro-N-phenylmethanesulfenamide; 1,1-dichloro-N-[(dimethylamino)sulfonyl]-1-fluoro-N-(4-methylphenyl)methanesulfeneamide, N'-(3,4-dichlorophenyl)-N,N'-dimethyl urea; N'-tert-butyl-N-cyclopropyl-6-(methylthio)-1,3,5-triazine-2,4-diamine, and 4-bromo-2-(4-chlorophenyl)-5-(trifluoromethyl)-1H-pyrrole-3-carbonitrile.

The antifouling agents may be used alone or in combination of two or more kinds.

The content of the antifouling agent in the coating composition is preferably less than or equal to 30 parts by mass, more preferably less than or equal to 20 parts by mass, and further preferably less than or equal to 10 parts by mass with respect to 100 parts by mass of the silicon atom-containing resin.

(5) Other Ingredients

The coating composition may contain other ingredients than the above-mentioned ingredients. As other ingredients, for example, additives such as a pigment, a water binder, an anti-sagging agent, an anti-flooding agent, an anti-settling agent, a coating film exhaustion conditioner, a UV absorber, a surface conditioner, a viscosity conditioner, a leveling agent, and a pigment disperser, and solvents and the like can be recited.

As the pigment, for example, extender pigments such as sedimentary barium, talc, clay, chalk, silica white, alumina white, bentonite, calcium carbonate, magnesium carbonate, silicic acid, silicates, aluminum oxide hydrates and calcium sulfate; and coloring pigments such as titanium oxide, zircon oxide, basic lead sulfate, tin oxide, carbon black, white lead, graphite, zinc sulfide, zinc oxide, chromic oxide, yellow nickel titanium, yellow chromium titanium, yellow iron oxide, red iron oxide (rouge), black iron oxide, azoic red and yellow pigment, chromium yellow, phthalocyanine green, phthalocyanine blue, ultramarine blue and quinacridone can be recited.

The pigments may be used alone or in combination of two or more kinds.

As the solvent, for example, hydrocarbons such as toluene, xylene, ethylbenzene, cyclopentane, octane, heptane, cyclohexane and white spirit; ethers such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether, diethylene glycol monoethyl ether and butyl cellosolve; esters such as butyl acetate, propyl acetate, benzyl acetate, ethylene glycol monomethyl ether acetate and ethylene glycol monoethyl ether acetate; ketones such as ethylisobutyl ketone and methylisobutyl ketone; alcohols such as n-butanol and propyl alcohol; and the like can be recited.

The solvents may be used alone or in combination of two or more kinds.

(6) Preparation of Coating Composition

The coating composition of the present invention can be prepared, for example, by adding, to the silicon atom-containing resin or a resin composition containing the same (for example, a solution or dispersion containing the silicon atom-containing resin), the defoaming agent and, as necessary, other ingredients such as a pigment and a solvent, and mixing them by using a mixer such as a ball mill, a pebble mill, a roll mill, a sand grind mill, or a high speed disperser.

<Coating Film and Composite Coating Film>

The coating film of the present invention can be formed by applying the coating composition on a surface of an object to be coated according to a routine method, and then removing a solvent by volatilization at room temperature or under heating as necessary.

Examples of an application method of the coating composition include conventionally known methods such as immersion method, spray method, brush coating, roller, electrostatic coating, and electrodeposition coating.

Examples of the object to be coated include a ship and an in-water structure. Examples of the in-water structure include various fish nets such as fish nets for farming and other fishing equipment; harbor facilities; oilfences; intake equipment of an electric generation plant or the like; piping such as water conduits for cooling; bridges, buoyage; industrial water system facilities; and submarine bases.

A coating film formed by using the coating composition of the present invention can be excellent in the antifouling property, low friction performance and adhesion to the substrate.

An application surface of the object to be coated may be pretreated as necessary, or on a primer film of another paint such as an antirust paint (anticorrosion paint) formed on an object to be coated, a coating film formed from the coating composition of the present invention may be formed to produce a composite film.

According to the coating composition of the present invention, since the silicon atom-containing resin itself serving as a vehicle can exhibit good antifouling performance, it is possible to eliminate the addition of antifouling agent, or to reduce the amount of addition thereof. Therefore, according to the coating composition of the present invention, it is possible to form a clear (highly transparent) antifouling coating film.

An antifouling film formed from a conventional antifouling coating composition mainly containing a large amount of cuprous oxide as an antifouling agent generally takes on a reddish color phase due to the contained cuprous oxide, and the color phase thereof is limited; however, according to the present invention, various applications utilizing the transparency of the obtained coating film are possible. In forming a clear coating film, it is preferred that the coating composition of the present invention does not contain a coloring pigment.

For example, in the composite film including a primer film formed from an antirust paint or the like and a coating film of the present invention formed on the primer film, by using a clear antifouling film as the coating film of the present invention and those having various color phases as the antirust paint, it is possible to provide a coated object such as an in-water structure having a composite film-formed surface having a color phase that is not conventionally realized, while having an antifouling property.

Also by forming an intermediate film of a paint having various color phases between the primer film of an antirust paint or the like and the clear antifouling film, it is possible to provide a coated object having a color phase that is not conventionally realized.

As the paint forming the intermediate film, for example, various paints such as an antifouling paint, an epoxy resin paint, a urethane resin paint, a (meth)acrylic resin paint, a chlorinated rubber paint, an alkyd resin paint, a silicon resin paint, and a fluorine resin paint may be used.

The antifouling paint forming the intermediate film may be the coating composition of the present invention, or a different antifouling coating composition such as a conventional antifouling coating composition containing a relatively large amount of antifouling agent.

The intermediate film may be formed on the entire surface of the primer film, or may be formed on part of the surface. The intermediate film and the primer film may be a used old coating film. In this case, the coating film of the present invention may be used for repairing the old coating film.

Also by forming the intermediate film between the primer film of an antirust paint or the like and the clear antifouling film into the form of, for example, a character, pattern, design, or picture having various color phases, various design features can be imparted to the coated object.

By interposing a film or a seal member in the form of a character, pattern, design, or picture having various color phases, in place of the intermediate film interposed between the primer film and the clear antifouling film, various design features can be imparted to the coated object.

EXAMPLES

In the following, the present invention will be described more specifically by way of examples and comparative examples; however, it is to be noted that the present invention will not be limited to these.

Production Example S1: Preparation of Resin Composition S1 Containing Silicon Atom-Containing Resin A four-neck flask equipped with a stirrer, a condenser, a temperature control device, a nitrogen introducing tube, and a dropping funnel was charged with 60 parts by mass of xylene, and kept at 100° C. A mixture liquid of a monomer according to a formulation (part by mass) of Table 1 and 1 part by mass of tert-butylperoxy-2-ethylhexanoate was added dropwise thereto at a constant velocity over 3 hours, and retained at this temperature for 30 minutes after end of the dropping.

Then, a mixture liquid of 40 parts by mass of xylene and 0.2 parts by mass of tert-butylperoxy-2-ethylhexanoate was added dropwise at a constant velocity over 30 minutes, and retained at this temperature for 1.5 hours after end of the dropping, to obtain a varnish A.

The solid content in the resulting varnish A was 50.1% by mass, and the viscosity thereof was 18 poise.

The number average molecular weight (GPC, in terms of polystyrene, the same applies to the following) of the silicon atom-containing resin contained in the varnish A was 12000.

In the following examples, this varnish A was used as it was as a "resin composition S1".

Production Example S2: Preparation of Resin Composition S2 Containing Silicon Atom-Containing Resin A reaction vessel similar to that used in Production Example S1 was charged with 60 parts by mass of xylol, and kept at 100° C. A mixture liquid of a monomer according to a formulation (part by mass) of Table 1 and 1 part by mass of tert-butylperoxy-2-ethylhexanoate was added dropwise thereto at a constant velocity over 3 hours, and retained at this temperature for 30 minutes after end of the dropping.

Then, a mixture liquid of 40 parts by mass of xylene and 0.2 parts by mass of tert-butylperoxy-2-ethylhexanoate was added dropwise at a constant velocity over 30 minutes, and retained at this temperature for 1.5 hours after end of the dropping, to obtain a varnish B.

The solid content in the resulting varnish B was 50.3% by mass, and the viscosity thereof was 23 poise.

The number average molecular weight of the silicon atom-containing resin contained in the varnish B was 13000.

In the following examples, this varnish B was used as it was as a "resin composition S2".

Production Example S3: Preparation of Resin Composition S3 Containing Silicon Atom-Containing Resin A reaction vessel similar to that used in Production Example S1 was charged with 60 parts by mass of xylol, and kept at 100° C. A mixture liquid of a monomer according to a formulation (part by mass) of Table 1 and 1 part by mass of tert-butylperoxy-2-ethylhexanoate was added dropwise thereto at a constant velocity over 3 hours, and retained at this temperature for 30 minutes after end of the dropping.

Then, a mixture liquid of 40 parts by mass of xylene and 0.2 parts by mass of tert-butylperoxy-2-ethylhexanoate was added dropwise at a constant velocity over 30 minutes, and retained at this temperature for 1.5 hours after end of the dropping, to obtain a varnish C.

The solid content in the resulting varnish C was 49.8% by mass, and the viscosity thereof was 10 poise.

The number average molecular weight of the silicon atom-containing resin contained in the varnish C was 11000.

In the following examples, this varnish C was used as it was as a "resin composition S3".

Production Example S4: Preparation of Resin Composition S4 Containing Silicon Atom-Containing Resin A reaction vessel similar to that used in Production Example S1 was charged with 60 parts by mass of xylol, and kept at 100° C. A mixture liquid of a monomer according to a formulation (part by mass) of Table 1 and 1 part by mass of tert-butylperoxy-2-ethylhexanoate was added dropwise thereto at a constant velocity over 3 hours, and retained at this temperature for 30 minutes after end of the dropping.

Then, a mixture liquid of 40 parts by mass of xylene and 0.2 parts by mass of tert-butylperoxy-2-ethylhexanoate was added dropwise at a constant velocity over 30 minutes, and retained at this temperature for 1 hour after end of the dropping, to obtain a varnish D.

The solid content in the resulting varnish D was 49.2% by mass, and the viscosity thereof was 7 poise.

The number average molecular weight of the silicon atom-containing resin contained in the varnish D was 10500.

In the following examples, this varnish D was used as it was as a "resin composition S4".

Production Example S5. Preparation of Resin Composition S5 Containing Silicon Atom-Containing Resin A reaction vessel similar to that used in Production Example S1 was charged with 64 parts by mass of xylol and 16 parts by mass of n-butanol and kept at 110° C. A mixture liquid of a monomer according to a formulation (part by mass) of Table 1 and 2 parts by mass of tert-butylperoxy-2-ethylhexanoate was added dropwise thereto at a constant velocity over 3 hours, and retained at this temperature for 1 hour after end of the dropping.

Thereafter, 20 parts by mass of xylene was added to obtain a varnish E. The solid content in the resulting varnish E was 49.5% by mass, and the viscosity thereof was 6 poise. The number average molecular weight of the resin contained in the varnish E was 8000, and the acid value thereof was 101 mgKOH/g.

Subsequently, 100 parts by mass of the varnish E, 19.6 parts by mass of zinc acetate, 30.3 parts by mass of naphthenic acid (NA-165, acid value 165 mgKOH/g, manufactured by Yamato Yushi Kogyo K.K.) and 60 parts by mass of xylene were added to a similar reaction vessel, the temperature was raised to a reflux temperature, and reaction was continued for 18 hours while removing the mixture liquid of acetic acid, water, and solvent in distillate and adding the same amount of a xylol/n-butanol mixture liquid. The end point of the reaction was determined by quantifying the amount of acetic acid in the distillate. After cooling the reaction liquid, n-butanol and xylene were added to obtain a "resin composition S5" having a solid content of 50.8%0/ by mass.

Production Example S6: Preparation of Resin Composition S6 Containing Silicon Atom-Containing Resin A reaction vessel similar to that used in Production Example S1 was charged with 40 parts by mass of xylol and 40 parts by mass of n-butanol and kept at 110° C. A mixture liquid of a monomer according to a formulation (part by mass) of Table 1 and 2 parts by mass of tert-butylperoxy-2-ethylhexanoate was added dropwise thereto at a constant velocity over 3 hours, and retained at this temperature for 1 hour after end of the dropping.

Then, a mixture liquid of 10 parts by mass of xylene, 10 parts by mass of n-butanol and 0.2 parts by mass of tert-butylperoxy-2-ethylhexanoate was added dropwise at a constant velocity over 30 minutes, and retained at this temperature for 1 hour after end of the dropping, to obtain a varnish F. The solid content in the resulting varnish F was 50.0% by mass, and the viscosity thereof was 9 poise. The number average molecular weight of the resin contained in the varnish F was 8000, and the acid value thereof was 130 mgKOH/g.

Next, reaction was carried out in the same manner as in Production Example S5 except that 100 parts by mass of the varnish F, 25.4 parts by mass of zinc acetate, 40.6 parts by mass of WW rosin (acid value 160 mgKOH/g), and 60 parts by mass of xylene were added to a similar reaction vessel, and thus a "resin composition S6" having a solid content of 48.7% by mass was obtained.

Production Example S7: Preparation of Resin Composition S7 Containing Silicon Atom-Containing Resin A reaction vessel similar to that used in Production Example S1 was charged with 56 parts by mass of xylol and 14 parts by mass of n-butanol and kept at 105° C. A mixture liquid of a monomer according to a formulation (part by mass) of Table 1 and 2 parts by mass of azobisisobutyronitrile was added dropwise thereto at a constant velocity over 3 hours, and retained at this temperature for 1 hour after end of the dropping, and thus a varnish G was obtained.

The solid content in the resulting varnish G was 50.3% by mass, and the viscosity thereof was 11 poise. The number average molecular weight of the resin contained in the varnish G was 9000, and the acid value thereof was 50 mgKOH/g.

Next, reaction was carried out in the same manner as in Production Example S5 except that 100 parts by mass of the varnish G, 9.3 parts by mass of copper acetate, 12.5 parts by mass of naphthenic acid (NA-200, acid value 200 mgKOH/g, manufactured by Yamato Yushi Kogyo K.K.), and 60 parts by mass of xylene were added to a similar reaction vessel, and thus a "resin composition S7" having a solid content of 51.5% by mass was obtained.

Production Example S8: Preparation of Resin Composition S8 Containing Silicon Atom-Containing Resin A reaction vessel similar to that used in Production Example S1 was charged with 56 parts by mass of xylol and 14 parts by mass of n-butanol and kept at 105° C. A mixture liquid of a monomer according to a formulation (part by mass) of Table 1 and 2 parts by mass of tert-butylperoxy-2-ethylhexanoate was added dropwise thereto at a constant velocity over 3 hours, and retained at this temperature for 30 minutes after end of the dropping.

Then, a mixture liquid of 24 parts by mass of xylene, 6 parts by mass of n-butanol and 0.2 parts by mass of tert-butylperoxy-2-ethylhexanoate was added dropwise at a constant velocity over 30 minutes, and retained at this temperature for 1.5 hours after end of the dropping, to obtain a varnish H. The solid content in the resulting varnish H was 50.8% by mass, and the viscosity thereof was 9 poise. The number average molecular weight of the resin contained in the varnish H was 8500, and the acid value thereof was 70 mgKOH/g.

Next, reaction was carried out in the same manner as in Production Example S5 except that 100 parts by mass of the varnish H, 12.9 parts by mass of copper acetate, 21.9 parts by mass of hydrogenated rosin (HYPALE CH, acid value 160 mgKOH/g, manufactured by Arakawa Chemical Industries, Ltd.), and 60 parts by mass of xylene were added to a similar reaction vessel, and thus a "resin composition S8" having a solid content of 52.5% by mass was obtained.

Production Example T1: Preparation of Resin Composition T1

A reaction vessel similar to that used in Production Example S1 was charged with 60 parts by mass of xylol, and kept at 100° C. A mixture liquid of a monomer according to a formulation (part by mass) of Table 1 and 1 part by mass of tert-butylperoxy-2-ethylhexanoate was added dropwise thereto at a constant velocity over 3 hours, and retained at this temperature for 1 hour after end of the dropping.

Then, a mixture liquid of 20 parts by mass of xylene and 0.2 parts by mass of tert-butylperoxy-2-ethylhexanoate was added dropwise at a constant velocity over 30 minutes, and retained at this temperature for 1 hour after end of the dropping, and then 20 parts by mass of xylol was added to obtain a varnish I.

The solid content in the resulting varnish I was 49.7% by mass, and the viscosity thereof was 13 poise.

The number average molecular weight of the silicon atom-containing resin contained in the varnish I was 11000.

In the following comparative examples, this varnish I was used as it was as a "resin composition T1".

Production Example T2: Preparation of Resin Composition T2

A reaction vessel similar to that used in Production Example S1 was charged with 60 parts by mass of xylol, and kept at 100° C. A mixture liquid of a monomer according to a formulation (part by mass) of Table 1 and 1 part by mass of tert-butylperoxy-2-ethylhexanoate was added dropwise thereto at a constant velocity over 3 hours, and retained at this temperature for 1 hour after end of the dropping.

Then, a mixture liquid of 20 parts by mass of xylene and 0.2 parts by mass of tert-butylperoxy-2-ethylhexanoate was added dropwise at a constant velocity over 30 minutes, and retained at this temperature for 1.5 hours after end of the dropping, and then 20 parts by mass of xylol was added to obtain a varnish J.

The solid content in the resulting varnish J was 50.5% by mass, and the viscosity thereof was 11 poise.

The number average molecular weight of the silicon atom-containing resin contained in the varnish J was 10000.

In the following comparative examples, this varnish J was used as it was as a "resin composition T2".

Production Example T3: Preparation of Resin Composition T3

A reaction vessel similar to that used in Production Example S1 was charged with 64 parts by mass of xylol and 16 parts by mass of n-butanol and kept at 110° C. A mixture liquid of a monomer according to a formulation (part by mass) of Table 1 and 2 parts by mass of tert-butylperoxy-2-ethylhexanoate was added dropwise thereto at a constant velocity over 3 hours, and retained at this temperature for 30 minutes after end of the dropping.

Then, a mixture liquid of 16 parts by mass of xylene, 4 parts by mass of n-butanol and 0.2 parts by mass of tert-butylperoxy-2-ethylhexanoate was added dropwise at a constant velocity over 30 minutes, and retained at this temperature for 1 hour after end of the dropping, to obtain a varnish K. The solid content in the resulting varnish K was 51.0% by mass, and the viscosity thereof was 6 poise. The number average molecular weight of the resin contained in the varnish K was 7500, and the acid value thereof was 101 mgKOH/g.

Subsequently, 100 parts by mass of the varnish K, 19.6 parts by mass of zinc acetate, 30.3 parts by mass of naphthenic acid (NA-165, acid value 165 mgKOH/g, manufactured by Yamato Yushi Kogyo K.K.) and 60 parts by mass of xylene were added to a similar reaction vessel, the temperature was raised to a reflux temperature, and reaction was continued for 18 hours while removing the mixture liquid of acetic acid, water, and solvent in distillate and adding the same amount of a xylol/n-butanol mixture liquid. The end point of the reaction was determined by quantifying the amount of acetic acid in the distillate. After cooling the reaction liquid, n-butanol and xylene were added to obtain a "resin composition T3" having a solid content of 52.3% by mass.

Production Example T4: Preparation of Resin Composition T4

A reaction vessel similar to that used in Production Example S1 was charged with 35 parts by mass of xylol and 35 parts by mass of n-butanol and kept at 100° C. A mixture liquid of a monomer according to a formulation (part by mass) of Table 1 and 2 parts by mass of tert-butylperoxy-2-ethylhexanoate was added dropwise thereto at a constant velocity over 3 hours, and retained at this temperature for 30 minutes after end of the dropping.

Then, a mixture liquid of 15 parts by mass of xylene, 15 parts by mass of n-butanol and 0.2 parts by mass of tert-butylperoxy-2-ethylhexanoate was added dropwise at a constant velocity over 30 minutes, and retained at this temperature for 1.5 hours after end of the dropping, to obtain a varnish L. The solid content in the resulting varnish L was 50.2% by mass, and the viscosity thereof was 11 poise. The number average molecular weight of the resin contained in the varnish L was 9500, and the acid value thereof was 70 mgKOH/g.

Next, reaction was carried out in the same manner as in Production Example S5 except that 100 parts by mass of the varnish L, 12.9 parts by mass of copper acetate, 21.9 parts by mass of hydrogenated rosin (HYPALE CH, acid value 160 mgKOH/g, manufactured by Arakawa Chemical Industries, Ltd.), and 60 parts by mass of xylene were added to a similar reaction vessel, and thus a "resin composition T4" having a solid content of 52.2% by mass was obtained.

Table 1 summarizes the amounts (charged amounts) of the monomers used for preparing the varnishes A to L and the solid content and viscosity of the varnishes. The viscosity was measured at 25° C. using a Gardner foam viscometer (in accordance with JIS K-5600).

TABLE 1

| | | | A | B | C | D | E | F | G | H | I | J | K | L |
|---|---|---|---|---|---|---|---|---|---|---|---|---|---|---|
| Charging amount (parts by mass) | (a) | (a1) | FM-0711 | 45.0 | | 20.0 | 5.0 | 30.0 | | 10.0 | | | | | |
| | | | X-22-174BX | | 20.0 | | 10.0 | | 25.0 | 10.0 | 15.0 | | | | |
| | | | FM-0721 | | | | | | | | | 45.0 | | 15.0 | 20.0 |
| | | | X-22-2426 | | | | | | | | | | 20.0 | 15.0 | |
| | (a2) | | TM-0701 | | 10.0 | | | 5.0 | | 5.0 | | | | | |
| | (a3) | | FM-7711 | 10.0 | | | 10.0 | | 10.0 | | 5.0 | | | | |
| | | | X-22-164A | | 10.0 | 5.0 | | 5.0 | | 10.0 | | | | | |
| | | | X-22-164E | | | | | | | | | 10.0 | 5.0 | 5.0 | |
| | (a4) | | Silicon-containing monomer A | | | | 5.0 | | 5.0 | | | | | | |
| | (b) | | TIPSA | | | 40.0 | 30.0 | | | 30.0 | 20.0 | | 40.0 | | 26.0 |
| | (c) | | AA | | | | | 13.0 | 16.7 | 6.5 | 9.0 | | | 13.0 | 9.0 |
| | (d) | | MMA | 25.0 | 20.0 | 20.0 | 15.0 | 15.0 | 13.3 | 8.5 | 13.7 | 25.0 | 25.0 | 15.0 | |
| | | | EA | 10.0 | 10.0 | 15.0 | 5.0 | 12.0 | | 15.0 | 22.3 | 10.0 | 10.0 | 15.0 | 20.0 |
| | | | EHMA | | 5.0 | | | | | 10.0 | | | | 2.0 | |
| | | | CHMA | | 10.0 | | 10.0 | 15.0 | 10.0 | | 15.0 | | | 5.0 | 15.0 |
| | | | M90G | 10.0 | 15.0 | | 5.0 | 10.0 | 15.0 | | 15.0 | 10.0 | | 15.0 | 10.0 |
| Viscosity (poise) | | | | 18 | 23 | 10 | 7 | 6 | 9 | 11 | 9 | 13 | 11 | 6 | 11 |
| Solids (% by mass) | | | | 50.1 | 50.3 | 49.8 | 49.2 | 49.5 | 50.0 | 50.3 | 50.8 | 49.7 | 50.5 | 51.0 | 50.2 |

Product names and abbreviations shown in Table 1 are as follows. In Table 1, (c') corresponds to a monomer forming the monomer (c).

(1) FM-0711 (molecular weight: 1000, product name, manufactured by JNC Corporation): a monomer (a1) satisfying the formula (I'), wherein m=0, b=3, and $R^1$ to $R^5$ and $R^{31}$ are methyl groups.

(2) X-22-174BX (molecular weight: 2300, product name, manufactured by Shin-Etsu Chemical Co., Ltd.): a monomer (a1) satisfying the formula (I'), wherein m=0, and $R^1$ to $R^5$ and $R^{31}$ are methyl groups.

(3) FM-0721 (molecular weight: 5000, product name, manufactured by JNC Corporation): a monomer wherein m=0, b=3, and $R^1$ to $R^5$ and $R^{31}$ are methyl groups in the formula (I').

(4) X-22-2426 (molecular weight, 12000, product name, manufactured by Shin-Etsu Chemical Co., Ltd.): a monomer wherein m=0, and $R^1$ to $R^5$ and $R^{31}$ are methyl groups in the formula (I').

(5) TM-0701 (molecular weight: 423, product name, manufactured by JNC Corporation): a monomer (a2) satisfying the formula (II'), wherein p=0, d=3, and $R^6$ to $R^8$ and $R^{32}$ are methyl groups.

(6) FM-7711 (molecular weight: 1000, product name, manufactured by JNC Corporation): a monomer (a3) satisfying the formula (III'), wherein q and s=0, f and g=3, and $R^9$ to $R^{12}$ and $R^{33}$ and $R^{34}$ are methyl groups.

(7) X-22-164A (molecular weight: 1720, product name, manufactured by Shin-Etsu Chemical Co., Ltd.): a monomer (a3) satisfying the formula (III'), wherein q and s=0, f and g=3, and $R^9$ to $R^{12}$ and $R^{33}$ and $R^{34}$ are methyl groups.

(8) X-22-164E (molecular weight: 7800, product name, manufactured by Shin-Etsu Chemical Co., Ltd.): a monomer wherein q and s=0, f and g=3, and $R^9$ to $R^{12}$ and $R^{33}$ and $R^{34}$ are methyl groups in the formula (III').

(9) silicon-containing monomer A: (molecular weight: 1150, this monomer was sold by Nippon Unicar Co., Ltd. under the product name "F2-312-01"): a monomer (a4) satisfying the formula (IV'), wherein t and u=0, j and k=3, v and w=3, and $R^{13}$ to $R^{22}$ and $R^{35}$ and $R^{36}$ are methyl groups.

(10) TIPSA: triisopropylsilyl acrylate

(11) AA: acrylic acid

(12) MMA: methyl methacrylate

(13) EA: ethyl acrylate

(14) EHMA: 2-ethylhexyl methacrylate

(15) CHMA: cyclohexyl methacrylate

(16) M-90G: methoxypolyethyleneglycol methacrylate (NK ester M-90G, manufactured by Shin-Nakamura Chemical Co., Ltd.)

Examples 1 to 21 and Comparative Examples 1 to 12

According to the formulation (parts by mass) of Table 2 or 3, coating compositions were prepared by mixing any one of the resin compositions S1 to S8 and T1 to T4 obtained in Production Examples S1 to S8 and T1 to T4, and other ingredients shown in Table 2 or 3 using a high-speed disperser.

In Tables 2 and 3, "defoaming agent/100 parts of resin" corresponds to the content (parts by mass) of the defoaming agent with respect to 100 parts by mass of the resin (silicon atom-containing resin) contained in the resin composition.

TABLE 2

| | | Example | | | | | | | | | | |
|---|---|---|---|---|---|---|---|---|---|---|---|---|
| Units: parts by mass | | 1 | 2 | 3 | 4 | 5 | 6 | 7 | 8 | 9 | 10 | 11 |
| Resin composition | S1 | 79.9 | | | | | | | | 79.9 | 79.9 | 79.9 |
| | S2 | | 79.6 | | | | | | | | | |
| | S3 | | | 80.4 | | | | | | | | |
| | S4 | | | | 81.4 | | | | | | | |
| | S5 | | | | | 78.8 | | | | | | |
| | S6 | | | | | | 82.2 | | | | | |

TABLE 2-continued

|  |  |  |  |  |  |  |  |  |  |  |  |
|---|---|---|---|---|---|---|---|---|---|---|---|
| S7 |  |  |  |  |  |  | 77.7 |  |  |  |  |
| S8 |  |  |  |  |  |  |  | 76.3 |  |  |  |
| Rouge | 1.5 | 1.5 | 1.5 | 1.5 | 1.5 | 1.5 | 1.5 | 1.5 | 1.5 | 1.5 | 1.5 |
| Thermoplastic resin | 4.0 | 4.0 | 4.0 | 4.0 | 4.0 | 4.0 | 4.0 | 4.0 | 4.0 | 4.0 | 4.0 |
| Defoaming agent 1 (silicon-based) |  |  |  |  |  |  |  |  |  |  |  |
| Defoaming agent 2 (fluorine-modified silicon-based) | 1.8 | 1.8 | 1.8 | 1.8 | 1.8 | 1.8 | 1.8 | 1.8 | 0.3 | 4.8 | 9.5 |
| Defoaming agent 3 (non-silicon-based) |  |  |  |  |  |  |  |  |  |  |  |
| Xylene | 10.8 | 11.1 | 10.3 | 9.3 | 11.9 | 8.5 | 13.0 | 14.4 | 12.3 | 7.8 | 3.1 |
| Butyl cellosolve | 2.0 | 2.0 | 2.0 | 2.0 | 2.0 | 2.0 | 2.0 | 2.0 | 2.0 | 2.0 | 2.0 |
| Total | 100.0 | 100.0 | 100.0 | 100.0 | 100.0 | 100.0 | 100.0 | 100.0 | 100.0 | 100.0 | 100.0 |
| Defoaming agent/ resin 100 parts | 4.50 | 4.50 | 4.50 | 4.49 | 4.50 | 4.50 | 4.50 | 4.49 | 0.75 | 11.99 | 23.73 |

|  |  | Example |  |  |  |  |  |  |  |  |  |
|---|---|---|---|---|---|---|---|---|---|---|---|
| Units: parts by mass |  | 12 | 13 | 14 | 15 | 16 | 17 | 18 | 19 | 20 | 21 |
| Resin composition | S1 |  |  |  |  |  |  |  |  |  |  |
|  | S2 |  |  |  |  |  |  |  |  |  |  |
|  | S3 |  |  |  |  |  |  |  |  |  |  |
|  | S4 |  |  |  |  |  |  |  |  |  |  |
|  | S5 | 78.8 | 78.8 | 78.8 | 78.8 | 78.8 |  |  |  |  |  |
|  | S6 |  |  |  |  |  |  |  |  |  |  |
|  | S7 |  |  |  |  |  |  |  |  |  |  |
|  | S8 |  |  |  |  |  | 76.3 | 76.3 | 76.3 | 76.3 | 76.3 |
| Rouge |  | 1.5 | 1.5 | 1.5 | 1.5 | 1.5 | 1.5 | 1.5 | 1.5 | 1.5 | 1.5 |
| Thermoplastic resin |  | 4.0 | 4.0 | 4.0 | 4.0 | 4.0 | 4.0 | 4.0 | 4.0 | 4.0 | 4.0 |
| Defoaming agent 1 (silicon-based) |  |  |  |  | 0.3 | 9.5 |  |  |  |  |  |
| Defoaming agent 2 (fluorine-modified silicon-based) |  | 0.3 | 4.8 | 9.5 |  |  |  | 0.3 | 4.8 | 9.5 |  |
| Defoaming agent 3 (non-silicon-based) |  |  |  |  |  |  |  |  |  |  | 0.3 | 9.5 |
| Xylene |  | 13.4 | 8.9 | 4.2 | 13.4 | 4.2 | 15.9 | 11.4 | 6.7 | 15.9 | 6.7 |
| Butyl cellosolve |  | 2.0 | 2.0 | 2.0 | 2.0 | 2.0 | 2.0 | 2.0 | 2.0 | 2.0 | 2.0 |
| Total |  | 100.0 | 100.0 | 100.0 | 100.0 | 100.0 | 100.0 | 100.0 | 100.0 | 100.0 | 100.0 |
| Defoaming agent/ resin 100 parts |  | 0.75 | 11.99 | 23.73 | 0.75 | 23.73 | 0.75 | 11.98 | 23.72 | 0.75 | 23.72 |

TABLE 3

|  |  | Comparative Example |  |  |  |  |  |  |  |  |  |  |  |
|---|---|---|---|---|---|---|---|---|---|---|---|---|---|
| Units: parts by mass |  | 1 | 2 | 3 | 4 | 5 | 6 | 7 | 8 | 9 | 10 | 11 | 12 |
| Resin composition | S1 | 79.9 | 79.9 | 79.9 |  |  |  |  |  |  |  |  |  |
|  | S5 |  |  |  | 78.8 |  |  |  |  |  |  |  |  |
|  | S8 |  |  |  |  | 76.3 | 76.3 | 76.3 |  |  |  |  |  |
|  | T1 |  |  |  |  |  |  |  | 80.6 |  |  |  |  |
|  | T2 |  |  |  |  |  |  |  |  | 79.3 |  |  |  |
|  | T3 |  |  |  |  |  |  |  |  |  | 76.6 |  |  |
|  | T4 |  |  |  |  |  |  |  |  |  |  | 76.8 | 76.8 |
| Rouge |  | 1.5 | 1.5 | 1.5 | 1.5 | 1.5 | 1.5 | 1.5 | 1.5 | 1.5 | 1.5 | 1.5 | 1.5 |
| Thermoplastic resin 1 |  | 4.0 | 4.0 | 4.0 | 4.0 | 4.0 | 4.0 | 4.0 | 4.0 | 4.0 | 4.0 | 4.0 | 4.0 |
| Defoaming agent 1 (silicon-based) |  |  |  |  | 11.0 |  |  |  |  |  |  |  |  |
| Defoaming agent 2 (fluorine-modified silicon-based) |  | 0.0 | 0.2 | 11.0 |  |  |  |  | 0.3 | 1.8 | 0.3 | 9.5 |  |
| Defoaming agent 3 (non-silicon-based) |  |  |  |  |  | 0.0 | 0.2 | 11.0 |  |  |  |  | 1.8 |
| Xylene |  | 12.6 | 12.4 | 1.6 | 2.7 | 16.2 | 16.0 | 5.2 | 11.6 | 11.4 | 15.6 | 6.2 | 13.9 |
| Butyl cellosolve |  | 2.0 | 2.0 | 2.0 | 2.0 | 2.0 | 2.0 | 2.0 | 2.0 | 2.0 | 2.0 | 2.0 | 2.0 |
| Total |  | 100.0 | 100.0 | 100.0 | 100.0 | 100.0 | 100.0 | 100.0 | 100.0 | 100.0 | 100.0 | 100.0 | 100.0 |
| Defoaming agent/ resin 100 parts |  | 0.00 | 0.50 | 27.48 | 27.48 | 0.00 | 0.50 | 27.46 | 0.75 | 4.49 | 0.75 | 23.70 | 4.49 |

The details of ingredients described in Tables 2 to 3 are as follows.
(1) rouge (red iron oxide): "Toda Color KN-R" manufactured by Toda Kogyo Corp.
(2) thermoplastic resin: chlorinated paraffin ("TOYOPARAX A50" manufactured by TOSOH CORPORATION)
(3) defoaming agent 1 (silicon-based, not fluorine-modified): "KF-96" manufactured by Shin-Etsu Chemical Co., Ltd.
(4) defoaming agent 2 (fluorine-modified silicon-based): "BYK-063" manufactured by BYK.
(5) defoaming agent 3 (non-silicon-based): "BYK-1790" manufactured by BYK.

The defoaming property, low friction performance, and adhesion to the substrate were evaluated for the obtained antifouling coating compositions and antifouling coating films formed therefrom in accordance with the following evaluation method. Evaluation results are shown in Tables 4 and 5.

(1) Defoaming Property of Coating Composition
(1-1) Initial Defoaming Property

After the obtained antifouling composition was uniformly stirred, the obtained antifouling composition was applied onto the surface of a tin plate having dimensions of 200 mm×300 mm×0.3 mm (thickness) to have a film thickness of 150 μm to 200 μm by a medium brush roller, and then dried for 30 minutes at room temperature. Then, the appearance of the coating film was evaluated in accordance with the following evaluation criteria. Evaluation within A to C corresponds to a practical level.

[Evaluation Criteria]
A: The number of foams remaining per 10 cm$^2$ of the coating film is 0.
B: The number of foams remaining per 10 cm$^2$ of the coating film is 1.
C: The number of foams remaining per 10 cm$^2$ of the coating film is 2.
D: The number of foams remaining per 10 cm$^2$ of the coating film is greater than or equal to 3 and less than or equal to 5.
E: The number of foams remaining per 10 cm$^2$ of the coating film is greater than or equal to 6.

(1-2) Defoaming Property after Storage

After the obtained antifouling coating composition was stored at 40° C. for 1 month, the same evaluation test as in (1-1) above was carried out. Evaluation within A to C corresponds to a practical level.

(2) Low Friction Performance of Coating Film

The obtained antifouling coating composition was applied on a vinyl chloride cylindrical drum having a diameter of 10 cm and a height of 10 cm and then dried to form a coating film. The vinyl chloride cylindrical drum was rotated in sea water (about 15 knots in terms of circumferential speed), and then frictional resistance was measured by a torque meter. The frictional resistance of a smooth vinyl chloride cylindrical drum that was mirror-finished by buffing was measured as a standard, and increase and decrease in frictional resistance of each are shown in Tables 4 and 5. Frictional resistance immediately after immersion in sea water (initial) and after immersion for 1 month was evaluated. The "frictional resistance coefficient" shown in Tables 4 and 5 is a value calculated by the following formula.

"Frictional resistance coefficient"=[(frictional resistance when each antifouling coating composition is applied)−(standard frictional resistance)]/(standard frictional resistance)×100(%)

An energy consumption basic unit (meaning energy consumption per unit production amount, and generally fuel consumption deteriorates as the basic unit increases) is proportional to navigation resistance. Therefore, the smaller the frictional resistance coefficient is, the more reduction in energy consumption basic unit can be obtained. Since navigation of a ship may last for a long period of time, it is preferable that the frictional resistance coefficient is small not only at the initial stage but also after 1 month of immersion.

(3) Adhesion of Coating Film to Substrate

The obtained antifouling coating composition was applied on a blast plate previously coated with an antirust paint so that the dry film thickness was 150 μm, and dried by leaving it still in a room for two days and two nights, to obtain a coating film plate having an antifouling film.

The coating film plate having the antifouling coating film was immersed in sterilized filtered seawater for 3 months and then allowed to stand indoors for one day and one night to dry, to obtain a coating film test plate. Subsequently, the same antifouling coating composition as that used for forming the coating film was applied on the surface of the coating film so that the dry film thickness was 150 μm, and allowed to stand in the room for two days and two nights to dry, to obtain a test plate A.

Further, an antirust paint was applied on the coating film test plate so that the dry film thickness was 125 μm, and allowed to stand in the room for one day and one night to dry, to obtain a test plate B.

For the test plate A and the test plate B, a cross-cut adhesion test was conducted according to JIS K 5600.5.6 (clearance interval: 3 mm, and number of squares: 25). The numerical values in Tables 4 and 5 represent a score of a test result evaluated in accordance with the following evaluation criteria. Evaluation score greater than or equal to 8 corresponds to a practical level.

[Evaluation Criteria]
Score 10: Each scratch is thin and smooth in both sides, and has no peeling at an intersection of the scratch and in each square.
Score 8: Slight peeling is observed at an intersection of scratch, no peeling is observed in each square, and the area of a defected part is less than or equal to 5% of the entire square area.
Score 6: Peeling is observed on both sides and at an intersection of scratch, and the area of a defected part is greater than 5% and less than or equal to 15% of the entire square area.
Score 4: The width of peeling due to scratch is large, and the area of a defected part is greater than 15% and less than or equal to 35% of the entire square area.
Score 2: The width of peeling due to scratch is larger than that of score 4, and the area of a defected part is larger than 35% and less than or equal to 65% of the entire square area.
Score 0: The area of peeling is greater than 65% of the entire square area.

TABLE 4

| | | \multicolumn{11}{c|}{Example} |
|---|---|---|---|---|---|---|---|---|---|---|---|---|
| | | 1 | 2 | 3 | 4 | 5 | 6 | 7 | 8 | 9 | 10 | 11 |
| Defoaming property | Initial | A | A | A | A | A | A | A | A | A | A | A |
| | After storage | A | A | A | A | A | A | A | A | A | A | A |
| Frictional resistance coefficient (%) | Initial | 1.1 | 1.3 | 1.7 | 1.5 | 1.3 | 1.4 | 1.2 | 1.6 | 1.3 | 1.0 | 0.9 |
| | After immersion for 1 month | 0.8 | 0.9 | 1.0 | 0.9 | 0.8 | 0.8 | 0.6 | 0.7 | 0.8 | 0.7 | 0.6 |
| Adhesion | Test plate A | 10 | 10 | 10 | 10 | 10 | 10 | 10 | 10 | 10 | 10 | 10 |
| | Test plate B | 10 | 10 | 10 | 10 | 10 | 10 | 10 | 10 | 10 | 10 | 8 |

| | | \multicolumn{10}{c|}{Example} |
|---|---|---|---|---|---|---|---|---|---|---|---|
| | | 12 | 13 | 14 | 15 | 16 | 17 | 18 | 19 | 20 | 21 |
| Defoaming property | Initial | A | A | A | A | A | A | A | A | A | A |
| | After storage | A | A | A | B | A | A | A | A | C | A |
| Frictional resistance coefficient (%) | Initial | 1.5 | 1.2 | 1.1 | 1.5 | 1.1 | 1.7 | 1.5 | 1.3 | 1.9 | 1.4 |
| | After immersion for 1 month | 0.9 | 0.8 | 0.7 | 1.0 | 0.9 | 0.9 | 0.8 | 0.7 | 1.0 | 0.9 |
| Adhesion | Test plate A | 10 | 10 | 10 | 10 | 8 | 10 | 10 | 10 | 10 | 8 |
| | Test plate B | 10 | 10 | 8 | 8 | 8 | 10 | 10 | 8 | 8 | 8 |

TABLE 5

| | | \multicolumn{12}{c|}{Comparative Example} |
|---|---|---|---|---|---|---|---|---|---|---|---|---|---|
| | | 1 | 2 | 3 | 4 | 5 | 6 | 7 | 8 | 9 | 10 | 11 | 12 |
| Defoaming property | Initial | E | D | A | A | E | E | A | E | B | E | A | B |
| | After storage | E | E | A | A | E | E | A | E | D | E | B | D |
| Frictional resistance coefficient (%) | Initial | 1.3 | 1.3 | 0.7 | 0.8 | 1.8 | 1.7 | 1.1 | 1.4 | 1.8 | 1.8 | 1.2 | 1.7 |
| | After immersion for 1 month | 1.1 | 1.0 | 0.7 | 0.7 | 1.4 | 1.2 | 0.9 | 0.9 | 1.3 | 1.5 | 1.0 | 1.0 |
| Adhesion | Test plate A | 4 | 6 | 4 | 4 | 4 | 6 | 4 | 6 | 8 | 4 | 4 | 6 |
| | Test plate B | 4 | 4 | 2 | 2 | 4 | 4 | 2 | 6 | 6 | 4 | 2 | 6 |

Example 22

An antifouling coating composition was prepared by mixing the following ingredients with a high speed disperser, and the defoaming property, low friction performance and adhesion to the substrate were evaluated in accordance with the above evaluation method Evaluation results were all equivalent to those of the antifouling coating composition of Example 1.

Resin composition S1: 73.2 parts by mass

Titanium oxide ("TI-PURE R-900" manufactured by Du Pont Kabushiki Kaisha): 1.2 parts by mass Azo-based red pigment ("FUJI FAST RED 2305A" manufactured by Fuji Pigment CO., Ltd.): 2.1 parts by mass Thermoplastic resin (polyvinyl ether "Lutonal A25" manufactured by BASF Japan Ltd.): 4.2 parts by mass Defoaming agent 2 (fluorine-modified silicon-based, "BYK-063" manufactured by BYK): 1.8 parts by mass Anti-sagging agent ("Disparlon A 600-20 X" manufactured by Kusumoto Chemicals Ltd.): 5.5 parts by mass Xylene: 10.0 parts by mass Butyl cellosolve: 2.0 parts by mass Example 23

An antifouling coating composition was prepared by mixing the following ingredients with a high speed disperser, and the defoaming property, low friction performance and adhesion to the substrate were evaluated in accordance with the above evaluation method. Evaluation results were all equivalent to those of the antifouling coating composition of Example 2.

Resin composition S2: 68.6 parts by mass

Titanium oxide ("TI-PURE R-900" manufactured by Du Pont Kabushiki Kaisha): 2.0 parts by mass Phthalocyanine blue ("CYANINE BLUE G-105" manufactured by Sanyo Color Works, Ltd.): 3.0 parts by mass Thermoplastic resin (chlorinated paraffin "TOYOPARAX A50" manufactured by TOSOH CORPORATION): 4.1 parts by mass Defoaming agent 2 (fluorine-modified silicon-based, "BYK-063" manufactured by BYK): 1.6 parts by mass Anti-sagging agent ("Disparlon A 600-20 X" manufactured by Kusumoto Chemicals Ltd.): 5.5 parts by mass Xylene: 13.2 parts by mass Butyl cellosolve: 2.0 parts by mass

Example 24

An antifouling coating composition was prepared by mixing the following ingredients with a high speed disperser, and the defoaming property, low friction performance and adhesion to the substrate were evaluated in accordance with the above evaluation method. Evaluation results were all equivalent to those of the antifouling coating composition of Example 3.

Resin composition S3: 69.5 parts by mass
Titanium oxide ("TI-PURE R-900" manufactured by Du Pont Kabushiki Kaisha): 1.5 parts by mass
Rouge ("Toda Color KN-R" manufactured by Toda Kogyo Corp.): 5.0 parts by mass
Thermoplastic resin (chlorinated paraffin "TOYOPARAX A50" manufactured by TOSOH CORPORATION): 4.0 parts by mass
Defoaming agent 2 (fluorine-modified silicon-based, "BYK-063" manufactured by BYK): 1.5 parts by mass
Anti-sagging agent ("Disparlon A 600-20 X" manufactured by Kusumoto Chemicals Ltd.): 5.5 parts by mass
Xylene: 11.0 parts by mass
Butyl cellosolve: 2.0 parts by mass

The invention claimed is:

1. A coating composition comprising a silicon atom-containing resin and a defoaming agent,
wherein
the silicon atom-containing resin includes a constituent unit (A) derived from a monomer (a) having at least one kind of silicon atom-containing group selected from the group consisting of a group represented by a formula (I) below, a group represented by a formula (II) below, a group represented by a formula (III) below, and a group represented by a formula (IV) below,
the monomer (a) has a molecular weight of greater than or equal to 400 and less than or equal to 2500, and
a content of the defoaming agent is greater than or equal to 0.7 parts by mass and less than or equal to 24 parts by mass with respect to 100 parts by mass of the silicon atom-containing resin:

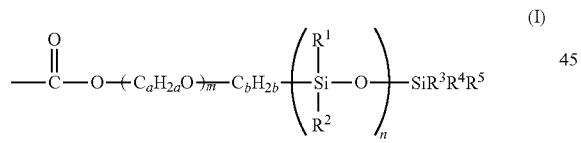

[wherein in the formula (I), a and b each independently represent an integer of 2 to 5, m represents an integer of 0 to 50, and n represents an integer of 3 to 80; and $R^1$ to $R^5$ each independently represent an alkyl group, an alkoxy group, a phenyl group, a substituted phenyl group, a phenoxy group, or a substituted phenoxy group];

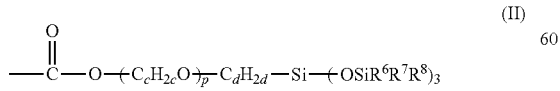

wherein in the formula (II), c and d each independently represent an integer of 2 to 5, and p represents an integer of 0 to 50; $R^6$, $R^7$, and $R^8$ each independently represent an alkyl group, $R^a$, or $R^b$;

$R^a$ is

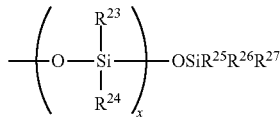

wherein x represents an integer of 0 to 20; and $R^{23}$ to $R^{27}$ are the same or different and each represent an alkyl group; and
$R^b$ is

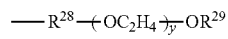

wherein y represents an integer of 1 to 20; and $R^{28}$ and $R^{29}$ are the same or different and each represent an alkyl group;

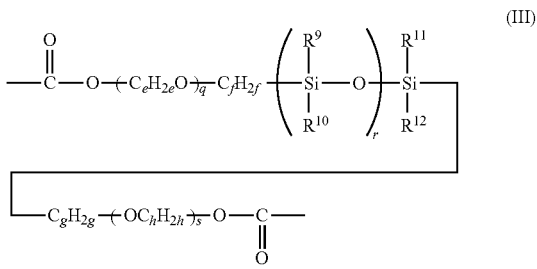

wherein in the formula (III), e, f, g, and h each independently represent an integer of 2 to 5, q and s each independently represent an integer of 0 to 50, and r represents an integer of 3 to 80; and $R^9$ to $R^{12}$ each independently represent an alkyl group, an alkoxy group, a phenyl group, a substituted phenyl group, a phenoxy group, or a substituted phenoxy group; and

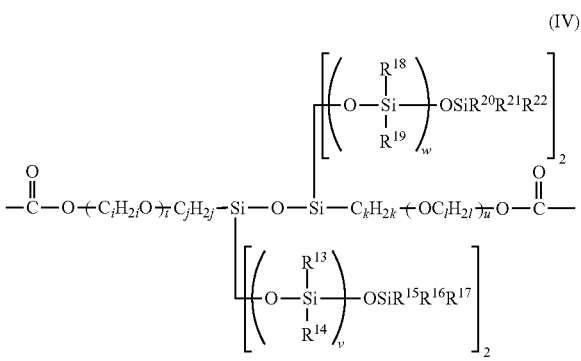

wherein in the formula (IV), i, j, k, and l each independently represent an integer of 2 to 5, t and u each independently represent an integer of 0 to 50, and v and w each independently represent an integer of 0 to 20; and $R^{13}$ to $R^{22}$ are the same or different and each represent an alkyl group.

2. The coating composition according to claim 1, wherein the monomer (a) is at least one kind selected from the group consisting of a monomer (a1) represented by a formula (I')

below, a monomer (a2) represented by a formula (II') below, a monomer (a3) represented by a formula (III') below, and a monomer (a4) represented by a formula (IV') below:

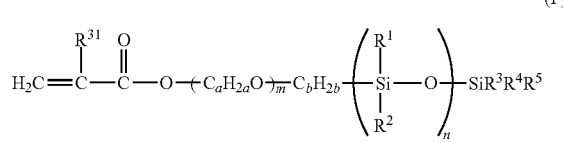
(I')

wherein in the formula (I'), $R^{31}$ represents a hydrogen atom or a methyl group, and a, b, m, n and $R^1$ to $R^5$ represent the same meaning as defined above;

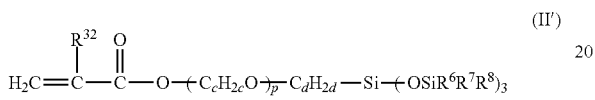
(II')

wherein in the formula (II'), $R^{32}$ represents a hydrogen atom or a methyl group, and c, d, p, and $R^6$ to $R^8$ represent the same meaning as defined above;

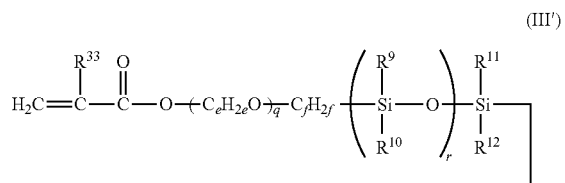
(III')

wherein in the formula (III'), $R^{33}$ and $R^{34}$ each independently represent a hydrogen atom or a methyl group, and e, f, g, h, q, r, s and $R^9$ to $R^{12}$ represent the same meaning as defined above; and wherein in the formula (IV'), $R^{35}$ and $R^{36}$ each independently represent a hydrogen atom or a methyl group, and i, j, k, l, t, u, v, w and $R^{13}$ to $R^{22}$ represent the same meaning as defined above.

3. The coating composition according to claim 1, wherein the silicon atom-containing resin further includes a constituent unit (B) derived from a monomer (b) having at least one kind of metal atom-containing group selected from the group consisting of a group represented by a formula (V) below and a group represented by a formula (VI) below:

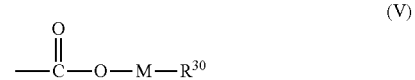
(V)

wherein in the formula (V), M represents a divalent metal atom, and $R^{30}$ represents an organic acid residue or an alcohol residue; and

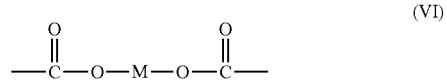
(VI)

wherein in the formula (VI), M represents a divalent metal atom.

4. The coating composition according to claim 3, wherein the monomer (b) is at least one kind selected from the group consisting of a monomer (b1) represented by a formula (V') below and a monomer (b2) represented by a formula (VI') below:

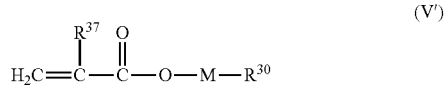
(V')

wherein in the formula (V'), $R^{37}$ represents a hydrogen atom or a methyl group, and M and $R^{30}$ represent the same meaning as defined above; and

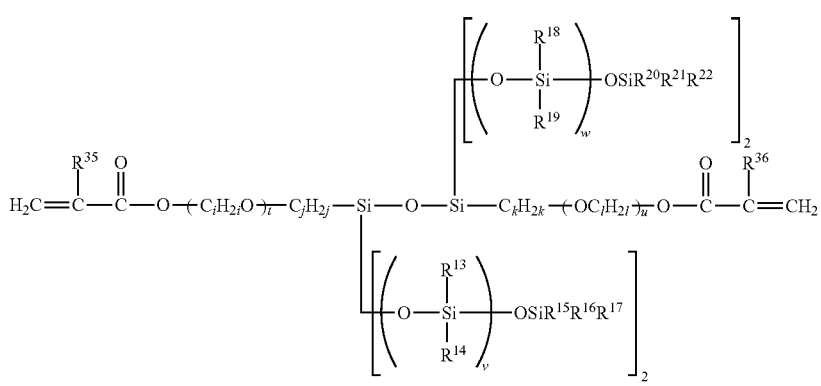
(IV')

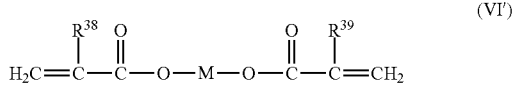

wherein in the formula (VI'), $R^{38}$ and $R^{39}$ each independently represent a hydrogen atom or a methyl group, and M represents the same meaning as defined above.

5. The coating composition according to claim 1, wherein the silicon atom-containing resin further includes a constituent unit (C) derived from a monomer (c) having a group represented by a formula (VII) below:

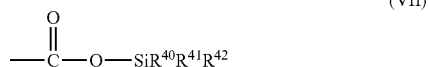

wherein in the formula (VII), $R^{40}$, $R^{41}$ and $R^{42}$ are the same or different and each represent a hydrocarbon residue having 1 to 20 carbon atoms.

6. The coating composition according to claim 5, wherein the monomer (c) is a monomer (c1) represented by a formula (VII') below:

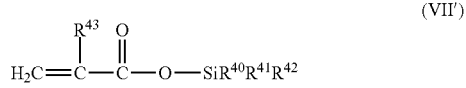

wherein in the formula (VII'), $R^{43}$ represents a hydrogen atom or a methyl group, and $R^{40}$ to $R^{42}$ represent the same meaning as defined above.

7. The coating composition according to claim 1, wherein the defoaming agent includes a silicon-based defoaming agent.

8. The coating composition according to claim 7, wherein the silicon-based defoaming agent is a fluorine-modified silicon-based defoaming agent.

9. A coating film formed from the coating composition according to claim 1.

10. A composite coating film comprising a primer coating film formed from an antirust paint, and a coating film formed from the coating composition according to claim 1 and overlaid on the primer coating film.

11. The composite coating film according to claim 10, wherein the composite coating film further comprises an intermediate coating film between the primer coating film and the coating film, and the intermediate coating film is formed on an entire or part of a surface of the primer coating film.

12. An in-water structure comprising the coating film according to claim 9.

13. A ship comprising the coating film according to claim 9.

14. An in-water structure comprising the composite coating film according to claim 10.

15. A ship comprising the composite coating film according to claim 10.

* * * * *